United States Patent
Anderson et al.

(10) Patent No.: US 12,060,056 B2
(45) Date of Patent: Aug. 13, 2024

(54) ACTIVE SAFETY SUSPENSION SYSTEM

(71) Applicant: ClearMotion, Inc., Billerica, MA (US)

(72) Inventors: Zackary Martin Anderson, Cambridge, MA (US); Marco Giovanardi, Melrose, MA (US); Clive Tucker, Charlestown, MA (US); Jack A. Ekchian, Belmont, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 18/358,636

(22) Filed: Jul. 25, 2023

(65) Prior Publication Data

US 2024/0166193 A1 May 23, 2024

Related U.S. Application Data

(63) Continuation of application No. 17/396,566, filed on Aug. 6, 2021, now Pat. No. 11,760,339, which is a
(Continued)

(51) Int. Cl.
*B60W 30/02* (2012.01)
*B60G 17/0195* (2006.01)
(Continued)

(52) U.S. Cl.
CPC ......... *B60W 30/02* (2013.01); *B60G 17/0195* (2013.01); *B60G 17/02* (2013.01);
(Continued)

(58) Field of Classification Search
CPC ...... B60W 30/02; B60W 10/20; B60W 10/22; B60W 50/14
(Continued)

(56) References Cited

U.S. PATENT DOCUMENTS

| | | | |
|---|---|---|---|
| 4,831,532 A | 5/1989 | Kondo | |
| 5,480,221 A * | 1/1996 | Morita | ................ B60T 8/328 303/113.5 |

(Continued)

FOREIGN PATENT DOCUMENTS

| | | |
|---|---|---|
| DE | 10 2010 023 434 A1 | 12/2011 |
| GB | 2465836 A | 6/2010 |

(Continued)

OTHER PUBLICATIONS

International Search Report and Written Opinion mailed Sep. 7, 2015 in connection with International Application No. PCT/US2015/023951.
(Continued)

*Primary Examiner* — Muhammad Shafi
(74) *Attorney, Agent, or Firm* — Wolf, Greenfield & Sacks, P.C.

(57) ABSTRACT

In some embodiments, a rapid-response active suspension system controls suspension force and position for improving vehicle safety and drivability. The system may interface with various sensors that detect safety critical vehicle states and adjust the suspension of each wheel to improve safety. Pre-crash and collision sensors may notify the active suspension controller of a collision and the stance may be adjusted to improve occupant safety during an impact while maintaining active control of the wheels. Wheel forces may also be controlled to improve the effectiveness of vehicle safety systems such as ABS and ESP in order to improve traction. Also, bi-directional information may be communicated between the active suspension system and other vehicle safety systems such that each system may respond to information provided to the other.

6 Claims, 20 Drawing Sheets

Related U.S. Application Data continuation of application No. 16/453,857, filed on Jun. 26, 2019, now Pat. No. 11,142,186, which is a continuation of application No. 15/300,500, filed as application No. PCT/US2015/023951 on Apr. 1, 2015, now Pat. No. 10,377,371.

(60) Provisional application No. 62/041,347, filed on Aug. 25, 2014, provisional application No. 61/974,408, filed on Apr. 2, 2014.

(51) Int. Cl.
- *B60G 17/02* (2006.01)
- *B60W 10/20* (2006.01)
- *B60W 10/22* (2006.01)
- *B60W 50/14* (2020.01)

(52) U.S. Cl.
CPC ............ *B60W 10/20* (2013.01); *B60W 10/22* (2013.01); *B60W 50/14* (2013.01); *B60G 2400/39* (2013.01); *B60G 2500/30* (2013.01); *B60G 2800/222* (2013.01); *B60G 2800/92* (2013.01); *B60G 2800/922* (2013.01); *B60W 2420/408* (2024.01); *B60W 2510/18* (2013.01); *B60W 2520/10* (2013.01); *B60W 2520/26* (2013.01); *B60W 2540/12* (2013.01); *B60W 2710/22* (2013.01); *B60W 2720/26* (2013.01)

(58) Field of Classification Search
USPC .......................................................... 701/48
See application file for complete search history.

(56) References Cited

U.S. PATENT DOCUMENTS

| | | | |
|---|---|---|---|
| 5,682,980 A * | 11/1997 | Reybrouck | B60G 17/08 280/124.16 |
| 5,704,446 A | 1/1998 | Chandy et al. | |
| 6,519,939 B1 | 2/2003 | Duff | |
| 6,658,335 B2 | 12/2003 | Kleinau | |
| 6,796,120 B2 | 9/2004 | Franchet et al. | |
| 7,051,526 B2 | 5/2006 | Geiger | |
| 7,206,678 B2 | 4/2007 | Arduc et al. | |
| 7,883,546 B2 | 2/2011 | Kazerooni et al. | |
| 7,942,225 B2 | 5/2011 | Carabelli et al. | |
| 8,776,961 B2 | 7/2014 | Mori et al. | |
| 8,839,920 B2 | 9/2014 | Anderson et al. | |
| 8,841,786 B2 | 9/2014 | Tucker et al. | |
| 8,892,304 B2 | 11/2014 | Lu et al. | |
| 9,108,484 B2 | 8/2015 | Reybrouck | |
| 10,300,760 B1 | 5/2019 | Aikin et al. | |
| 2008/0190104 A1 | 8/2008 | Bresie | |
| 2008/0275606 A1 | 11/2008 | Tarasinski et al. | |
| 2009/0248247 A1 * | 10/2009 | Furuichi | B60G 17/016 701/37 |
| 2009/0260935 A1 | 10/2009 | Avadhany et al. | |
| 2010/0072760 A1 | 3/2010 | Anderson et al. | |
| 2010/0262308 A1 | 10/2010 | Anderson et al. | |
| 2013/0041545 A1 * | 2/2013 | Bar | B62D 6/003 701/38 |
| 2013/0218414 A1 * | 8/2013 | Meitinger | B60W 10/20 701/38 |
| 2014/0195112 A1 * | 7/2014 | Lu | B60G 17/015 703/2 |
| 2014/0265168 A1 | 9/2014 | Giovanardi et al. | |

FOREIGN PATENT DOCUMENTS

| | | |
|---|---|---|
| JP | 3748334 B2 * | 2/2006 |
| WO | WO 02/20319 A1 | 3/2002 |
| WO | WO 2009-069793 A1 | 6/2009 |
| WO | WO 2010/066416 A1 | 6/2010 |
| WO | WO 2011/154026 A1 | 12/2011 |
| WO | WO 2011/159874 A2 | 12/2011 |
| WO | WO 2014/145018 A2 | 9/2014 |

OTHER PUBLICATIONS

International Preliminary Report on Patentability mailed Oct. 13, 2016 in connection with International Application No. PCT/US2015/023951.

Alleyne, Improved vehicle performance using combined suspension and braking forces. Vehicle System Dynamics, 27 (1997), pp. 235-265.

* cited by examiner

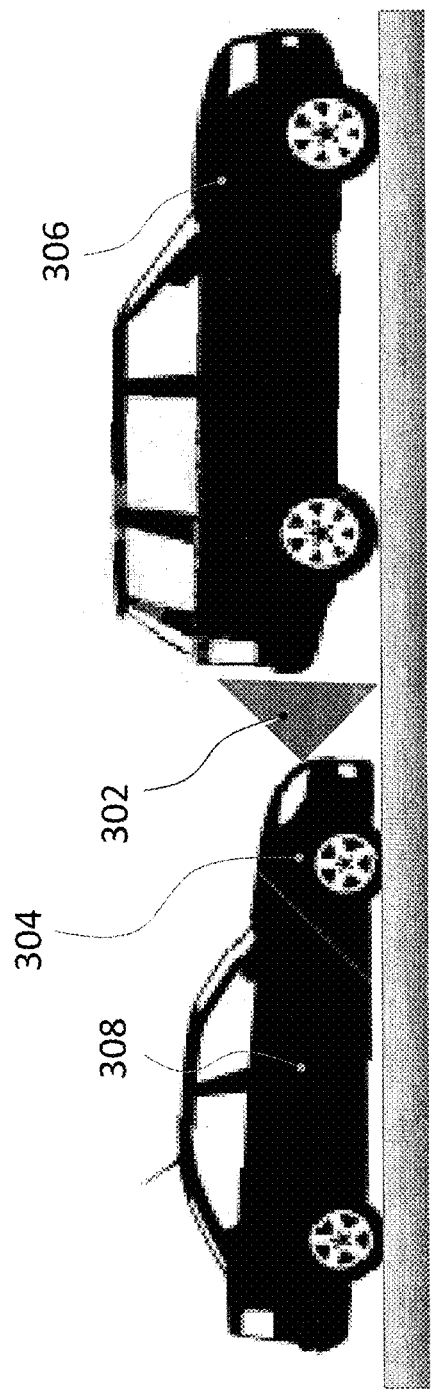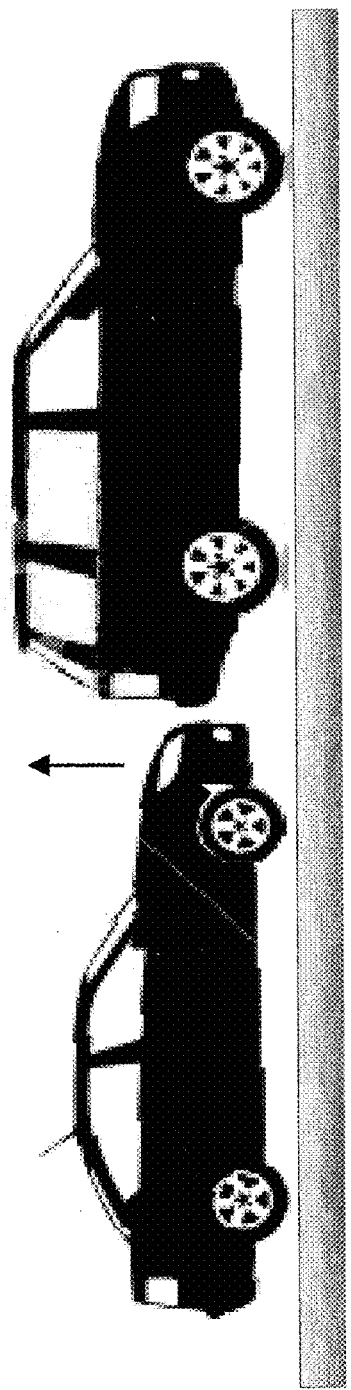
Fig. 3A
Fig. 3B

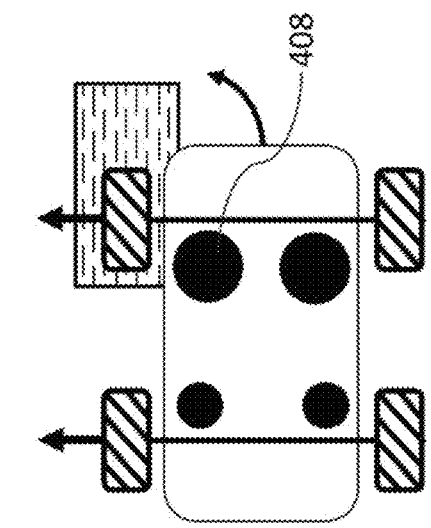
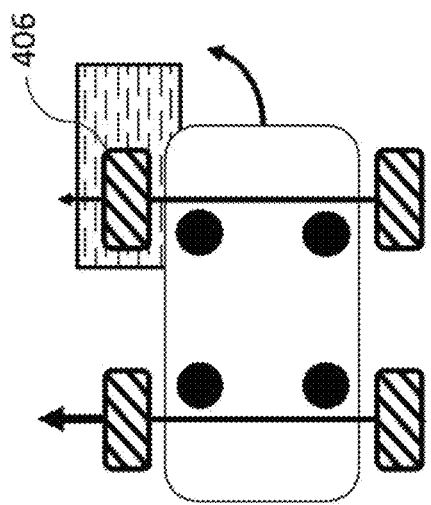
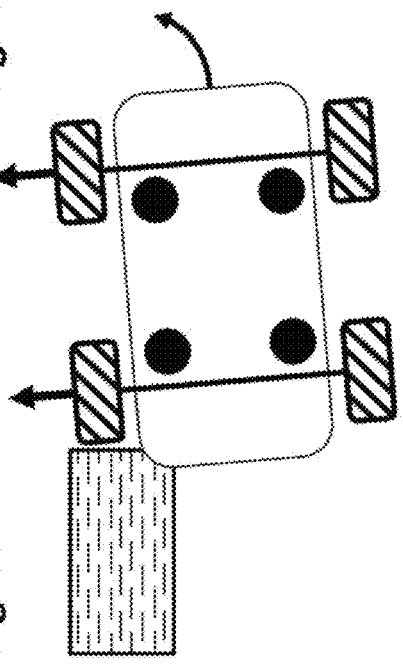
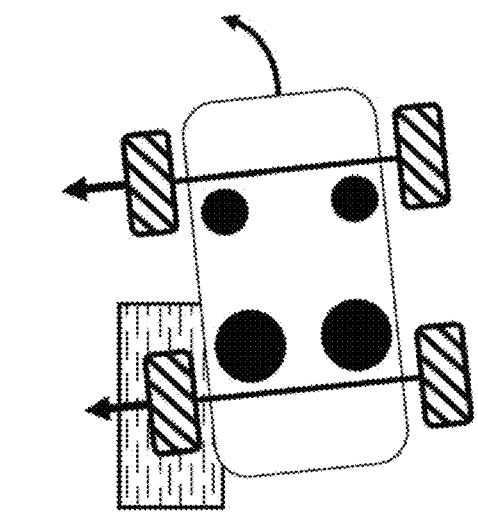
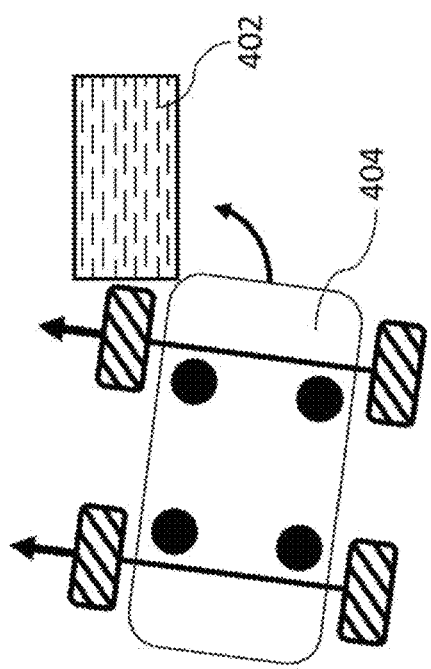

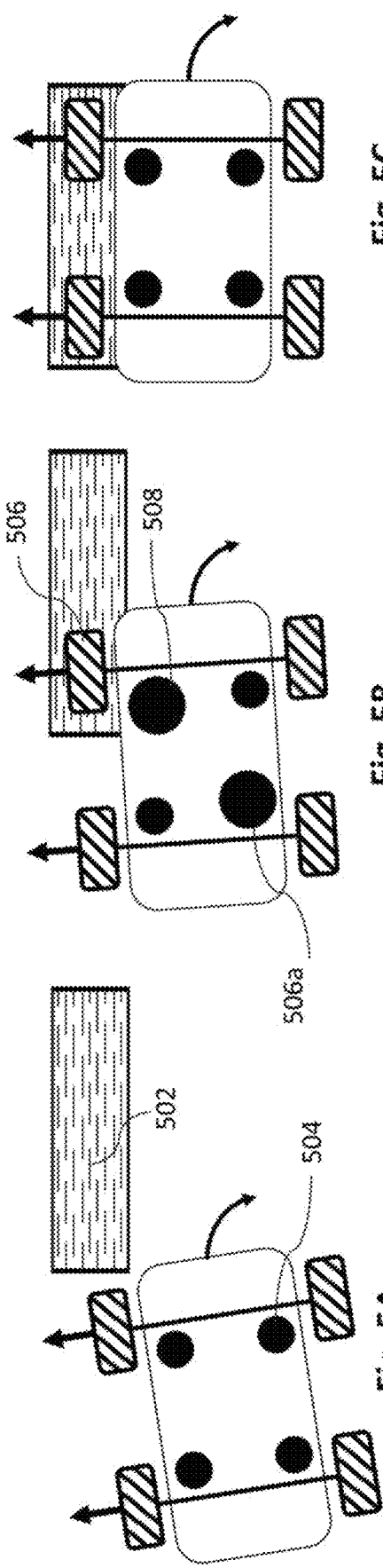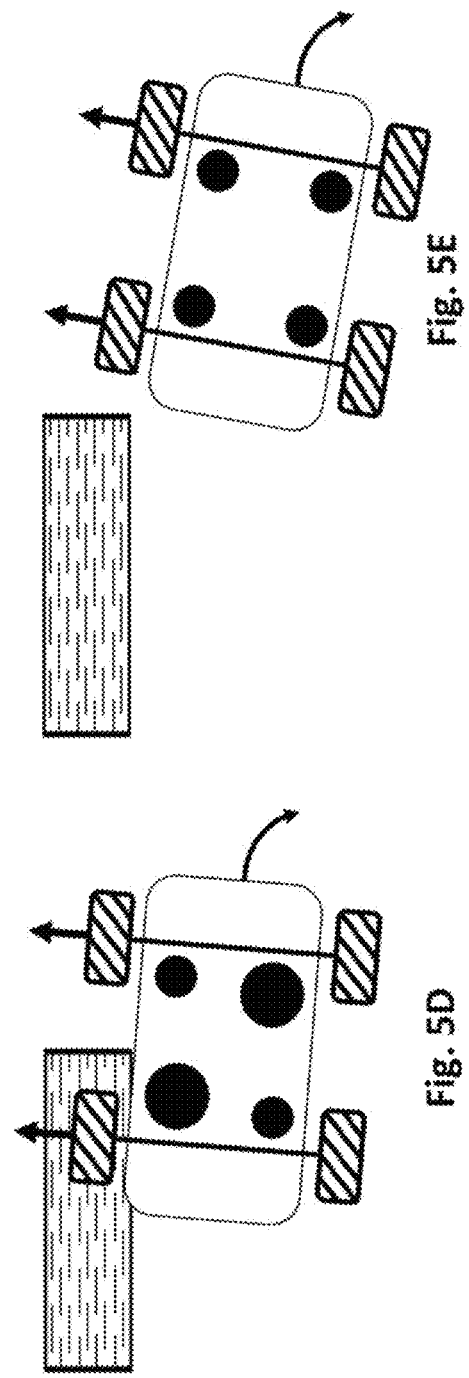

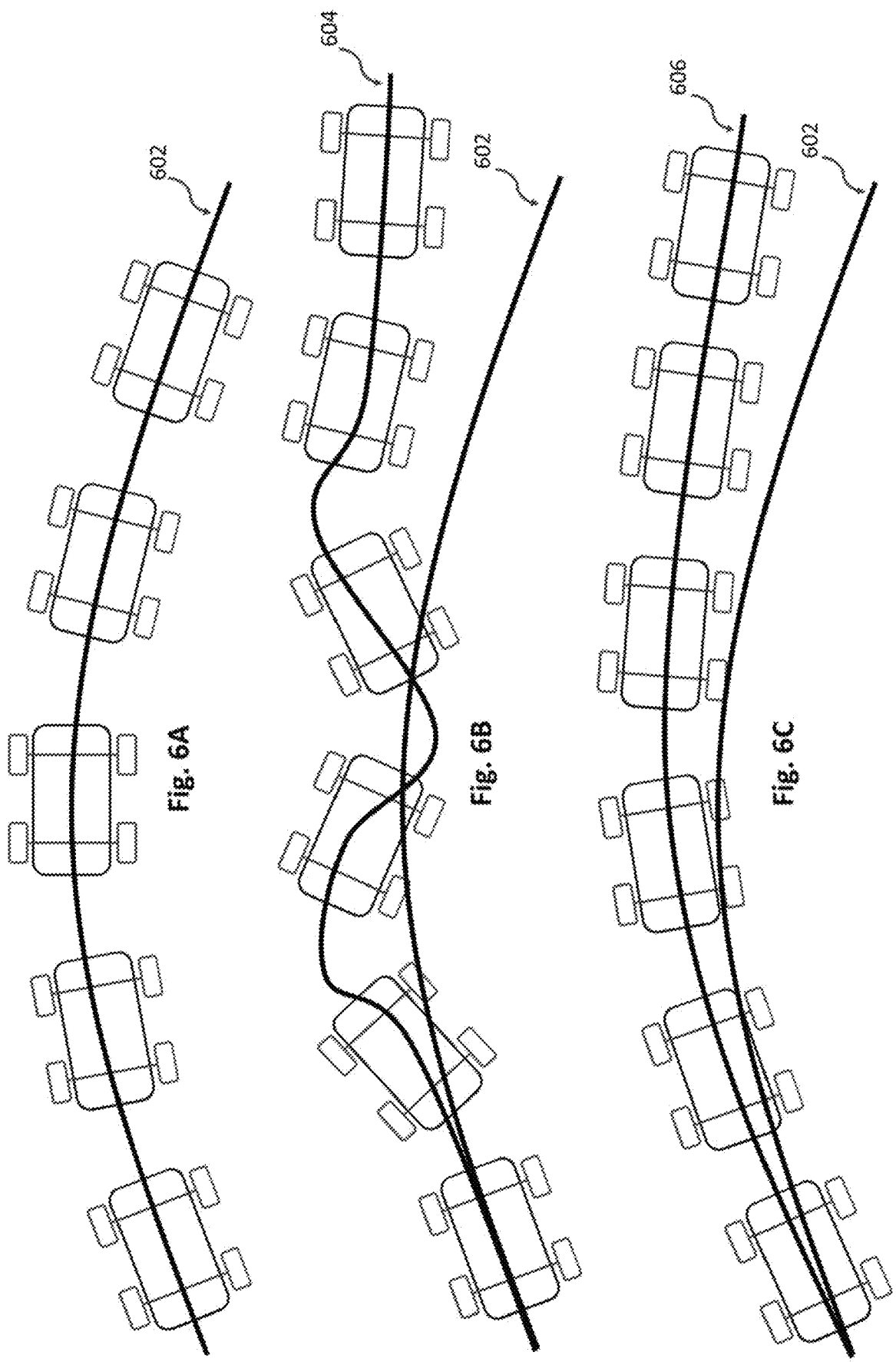

ACTIVE SAFETY SUSPENSION SYSTEM

CROSS-REFERENCE TO RELATED APPLICATIONS

This application is a continuation of U.S. application Ser. No. 17/396,566, filed Aug. 6, 2021, which is a continuation of U.S. application Ser. No. 16/453,857, filed Jun. 26, 2019, which a continuation of U.S. application Ser. No. 15/300,500, filed Sep. 29, 2016, which is a national stage filing under 35 U.S.C. § 371 of International Application No. PCT/US2015/023951, filed Apr. 1, 2015 which claims priority under 35 U.S.C. § 119(e) of U.S. provisional Application No. 61/974,408, filed Apr. 2, 2014, and U.S. provisional application No. 62/041,347, filed Aug. 25, 2014, the disclosures of each which are incorporated by reference in their entirety.

FIELD

Disclosed embodiments are related to active safety systems.

BACKGROUND

Vehicle designers prioritize passenger safety when developing vehicle systems. By increasingly incorporating sensors into a vehicle, vehicle systems are rapidly becoming much more aware of their environment and capable of responding to detected conditions. These conditions may indicate a threat of an undesirable outcome, such as, for example, an impending collision. Responses to a sensed input indicating an impending crash or other undesired outcome may include a wide range of actions, including controlling aspects of the vehicle's chassis or suspension system, controlling propulsion systems, responsive steering and braking, tightening seatbelts, adjusting passenger seat position, closing windows, and/or improving wheel traction (typically by employing brake action or torque vectoring in the rotational direction of the wheels).

Use of systems such as anti-lock braking (ABS), traction control, and electronic stability control have been instrumental in improving vehicle safety. Despite these improvements, however, accidents do occur. In situations when vehicles are able to determine that an accident is impending or is likely to occur, it is desirable that certain avoidance measures be taken to reduce the likelihood of the occurrence of an accident or reduce its severity if it does occur. A vehicle traveling at a speed of 60 mph will travel a distance of approximately 88 feet (27 m) per second. Therefore, in order for such actions to be effective, such defensive actions need to occur with sufficient swiftness.

Over the past several years, electric power steering (EPS) has gradually been replacing hydraulically assisted power steering in modern vehicles. EPS systems offer significant advantages compared to hydraulic systems. For example, since they draw power only when needed, cars with EPS tend to have better fuel economy. For example, when the vehicle is traveling in the straight forward direction, an EPS system is largely inactive and draws little or no power. They also eliminate the need for a hydraulic fluid circuit that is cumbersome to install and maintain.

However, in EPS systems the quantity of torque assist is not determined mechanically but is purely a function of the response of the ECU to input from sensors. This arrangement may mask road feel and driving response may suffer. EPS systems also typically exhibit increased steering torque and system inertia, which tends to make the system less responsive. To correct some of these deficiencies that are inherent in EPS systems, manufacturers increasingly must rely on computer based control strategies of the EPS so as to try to mimic some operationally desirable characteristics of traditional hydraulic systems.

Sensors are used to measure parameters such as steering wheel position, vehicle speed, vehicle acceleration, vehicle yaw angle and yaw rate, and the system typically relies on computations to determine the steering wheel torque that the driver would expect, given the state of the vehicle and road characteristics. The EPS controller then commands the EPS electric motor to present the appropriate response to the driver at the steering wheel. The contents of each of U.S. Pat. Nos. 5,704,446 and 6,658,335, which describe the construction, use and control of electric power steering systems, are incorporated herein by reference in their entirety.

SUMMARY

In some embodiments, the systems and methods disclosed herein may include a vehicle suspension system. The vehicle suspension system may include an active suspension system, which may include a plurality of actuators capable of operating in at least three modes corresponding to quadrants of operation. The vehicle suspension system may also include at least one sensor that is capable of detecting at least one condition or parameter indicative of, for example, an imminent collision of the vehicle with an object or the loss of traction on a slippery road surface. The vehicle suspension system may include a controller adapted to use the output of at least one sensor and to cause the active suspension to control at least one of the plurality of actuators in order, for example, to change the ride height of the vehicle. By controlling the motion of a wheel connected to at least one of the plurality of actuators, the system may also control, or substantially improve, wheel-to-road contact and ride height, for example, leading up to the imminent collision. In some embodiments, the at least one sensor may include, for example, at least one of a vision system, a LiDAR sensor, an accelerometer, a vehicle height sensor, and a radar sensor. In some embodiments, detecting the possibility or likelihood of an imminent collision includes detecting an object in a vehicle's predicted trajectory, estimating a time to impact, and determining whether the estimated time to impact is lower than an avoidance measure threshold. In some embodiments, the avoidance measure threshold may be a measure of vehicle maneuvering state comprising at least one of predicted or measured braking and steering rates given road or environmental conditions. The comparison to the avoidance measure threshold may be based on probabilistic or empirical models. In some embodiments, detection of an imminent collision includes the anticipation or prediction of a particular zone of impact on the vehicle and/or an object that may be struck.

In some embodiments, the systems and methods disclosed herein may include a vehicle suspension system. The vehicle suspension system may include an active suspension system with sufficiently rapid response to raise or lower a vehicle chassis in order to adjust vehicle height and orientation and to place the vehicle in an optimal posture (relative to the road) in preparation for a possible accident. The vehicle posture is defined as the position of the vehicle relative to the road surface. In some embodiments, such a suspension system may also simultaneously improve road traction by controlling wheel force, the force applied by the wheel on the road, or its normal component the wheel-to-road contact force (that determines traction) at one or more corners of the vehicle by using, for example, suspension system actuators. The active suspension system may be used to control instantaneous wheel force independently of controlling vehicle posture. The actuators may be used to move the vehicle body relative to the wheels at a particular, substantially constant, vehicle posture. The hydraulic actuators be directly linked with the vehicle body and the wheels where directly linked is defined as joined without an intervening series leaf or an intervening series coil spring. In some embodiments, the actuator may be used to provide substantially all the damping between each wheel and the vehicle body, i.e. without the use of an independent damper between the vehicle body and each wheel. The response time of the suspension system is improved if the use of a series spring element and/or parallel damping element is minimized.

In some embodiments an active suspension system may be used to dynamically provide wheel control (at least in the vertical direction) at frequencies in excess of the natural frequency of the vertical wheel movement. Active suspension systems may also be used to instantaneously modify tire traction by temporarily and selectively altering the normal (and resulting frictional) forces between the tires and the road surface. Depending on the embodiment, the active suspension system may have a response time under 50 milliseconds, less than 25 milliseconds and or less than 10 milliseconds to a command for a step change in applied vertical force (to the vehicle body), where the response time is defined as the delay between a command for a step change and reaching 90% of the steady state commanded output. In some embodiments, the sum of the maximum force capacity of all the actuators (active elements) of the suspension system is at least 50% of the vehicle weight.

In some embodiments of an active suspension system is a distributed system. A distributed system is defined as a system with a hydraulic motor/pump, an electric motor/generator and an electric controller located at each corner of the vehicle. In some embodiments of an active suspension system a hydraulic motor/pump, an electric motor generator and an electric controller is located at each corner of the vehicle and is integrated in a single unit. In some embodiments of an active suspension system an actuator comprising a piston that operates in lockstep with a motor/pump for at least a portion of the operating speed range of the actuator piston. Lockstep is defined as a configuration where the operating speed of the motor/generator is directly proportional to the operating speed of the actuator piston.

In some embodiments, in the instance that the object is a pedestrian, and the active suspension system may comprise at least one sensor and controller that are configured to detect the object as a pedestrian. In some embodiments, the controller is capable of detecting a position and or size of the pedestrian. In some embodiments, the changed ride height of the vehicle is set to mitigate an effect of impact on the pedestrian, and is a function of the sensed pedestrian positional and or size information. In some embodiments, the object is a truck trailer, and the vehicle is lifted to avoid or minimize a windshield impact. In some embodiments, the object is a second vehicle in front. In some embodiments, the object is a stationary object. In some embodiments, wherein the object is an overpass, a garage ceiling or objects attached to an overpass or to a ceiling, the controller lowers the ride height of the vehicle so that it will clear an underpass, a ceiling or objects attached to them. In some embodiments, the object is in the lane of travel and the controller temporarily raises the ride height of the vehicle to safely pass over the object. In some embodiments, the vehicle suspension operates cooperatively and/or synergistically with air springs of the vehicle. In some embodiments, the response time of the active suspension is substantially faster than the response time of the air springs. In some embodiments, the at least one of the plurality of actuators is capable of controlling ride height after an initial collision impact. In some embodiments, the active suspension includes a hydraulic actuator coupled to a hydraulic pump operatively coupled to an electric motor. In some embodiments, the vehicle state parameter includes a measure of vehicle movement. In some embodiments, the ride height of the vehicle is changed to align at least one of a front bumper and a rear bumper of the vehicle to be the first point of impact with an object or a second vehicle. In some embodiments, the controller causes the suspension system to control at least two of the plurality of actuators such that the plane of the vehicle chassis is not parallel with the road surface. In some embodiments, the controller causes the suspension system to control at least a one of the plurality of actuators such that the plane of the vehicle chassis either raises or lowers with respect to the road surface. In some embodiments, at least a portion of the active suspension system functions when one of the plurality of actuators is non-operative.

In some embodiments, the systems and methods disclosed herein may include an active suspension system for a vehicle which is configured to lower or raise the vehicle in response to operator commands. For example, upon entering a parking facility the driver may use an active suspension user interface to set the vehicle height in response to posted clearance signage at the facility entrance. A mechanism may be included to lock the actuator in position such as when the engine is turned off. For example, electronically controlled valves may be used to trap hydraulic fluid in an actuator to freeze it in position. However, in some embodiments mechanical locking mechanisms are used to lock the actuator in place.

In some embodiments, the systems and methods disclosed herein may include an active suspension system for a vehicle, such as, for example, a box truck or van, which may be configured to lower or raise the left or right side of the vehicle to reduce the propensity of the vehicle to tip as a result of a strong crosswind. By extending the actuators on the leeward side of the vehicle and/or compressing the actuators on the windward side the vehicle can be made to lean into the wind and be less likely to topple. A directional wind sensor may be used to measure the magnitude of the crosswind and to feed the information to the active suspension safety system.

In some embodiments, the systems and methods disclosed herein may include an active suspension system for a vehicle. The active suspension system may include a plurality of actuators capable of operation in at least three quadrants. In some embodiments, each of the plurality of actuators is capable of being individually controlled in order to create a force on its corresponding wheel in at least one axis. The active suspension system may also include at least one sensor disposed on the vehicle (such as, for example, on the chassis, wheels, etc.) to detect a vehicle state. The active suspension system may include a controller that can detect at least one of an anti-lock braking event and/or a stability control event, wherein upon detection of the event the controller causes the suspension system to apply force in at least one axis to at least one wheel in order to improve traction of at least one wheel. This improved traction may also result in improved performance of the anti-lock braking system and/or a stability control system. In some embodiments, the at least one axis includes the direction of suspension travel. In some embodiments, the at least one axis includes a vertical direction component. In some embodiments, the applied force includes temporarily increasing wheel directed force to a value that is greater than, thereby pushing the wheel towards the road for a short period of time. In some embodiments, the magnitude of the instantaneous force that may be applied is limited only by the capacity of the motor/pump. In some embodiments, detecting at least one of an anti-lock braking event and/or a stability control event includes receiving a signal from a vehicle ECU over a communications network. In some embodiments, the active suspension system of the vehicle configures actuator force on at least two diagonally opposed wheels to create a twist force on the vehicle chassis. In some embodiments, during an anti-lock braking event, the controller employs an algorithm to reduce wheel hop in response to at least one of pulsed braking and rough road conditions.

In some embodiments, the systems and methods disclosed herein may help mitigate the effects of a tire blowout. The method may include detecting a tire blowout condition at a wheel of a vehicle. The method may further include adapting control of a plurality of active suspension actuators disposed for controlling all of the wheels of the vehicle in response to the detected blowout condition. The method may also include, in response to the detected blowout condition, controlling the actuator disposed at the wheel with the tire blowout condition to rapidly apply a substantially vertical force on the wheel. In some embodiments, the substantially vertical force on the wheel is in the upward direction to reduce loading on the wheel. In some embodiments, detecting a tire blowout condition at a wheel includes measuring the output of a pressure sensor, wherein a blowout condition is detected when tire pressure is below a blowout condition air pressure threshold. In some embodiments, detecting a tire blowout condition at a wheel includes an algorithm measuring wheel movement in the substantially vertical direction and detecting an abnormal circumstance. An abnormal circumstance is defined as a circumstance wherein at least one wheel-related parameter being outside a pre-established operating range. In some embodiments, detecting a tire blowout condition at a wheel includes a combination of both a pressure sensor reading and a wheel movement algorithm. In some embodiments, detecting a tire blowout condition at a wheel includes receiving a signal indicating a blowout condition. In some embodiments, the signal is received from a vehicle electronic control unit. In some embodiments, applying the substantially vertical force on the wheel further includes a function of brake application state.

In some embodiments, the systems and methods disclosed herein may include a method of improving stability and/or performance of a vehicle by, at least in part, using an active suspension system. The method may include estimating and/or measuring at least one state parameter of the active suspension system of at least one wheel and/or at least one state parameter of the vehicle body. A state parameter of an active suspension system of at least one wheel is a parameter that describes at least one aspect of the state of the suspension system, such as for example, without limitation: the vertical position, velocity, or acceleration of the wheel with respect to the vehicle body, the absolute angular velocity and acceleration of the wheel, the wheel torque, the steering angle of the wheel, wheel force, and the air pressure of the tire. The wheel force is the force applied by the wheel on the road surface. The component of the wheel force that is normal to the road surface determines the frictional force between the tire (wheel) and the road surface. The vector sum of all the wheel forces of all the wheels of a vehicle, when the vehicle is at rest, is equal to total weight of the vehicle and any occupants and cargo. If the active suspension system includes a hydraulic actuator or damper, a state parameter of an active suspension system of at least one wheel may be, for example, without limitation: the pressure and/or temperature of hydraulic fluid in the hydraulic actuator or damper, the torque at the shaft of a hydraulic motor-pump that drives or is driven by the motion of a hydraulic actuator, and the angular position, velocity and acceleration of the motor-pump shaft. A state parameter of the vehicle body may be, for example, without limitation, absolute and or relative vehicle position, speed, direction (forward and/or lateral components) yaw, yaw rate, ride height, and vehicle posture. The method of improving stability and/or performance of a vehicle using an active suspension system may further include bi-directional or one-directional communication between an active suspension system and one or more other automatic Driver Assist and Safety (DAS) sub-systems. DAS sub-systems may comprise one or more systems, such as, for example, without limitation: an ABS (Anti-lock Braking System), an EPS (Electric Power Steering) system, a hydraulic power steering system, an ESC (electronic stability control) system, an automatic braking system, an active steering system (including for example spur gear actuators on the steering rack capable of autonomously adding or subtracting steering angle from the driver's input steering angle), and a rear steering system. Information, for example, about one or more suspension and vehicle state parameters and/or the timing of a particular action may be exchanged, directly or indirectly, between, an active suspension system and one or more DAS sub-systems. The method may also include receiving a command or information from an electronic control unit (ECU) of the vehicle. The method may further include controlling an active suspension actuator at least partially in response to the received command. The received command may include information about one or more vehicle sub-systems and/or commands given or being given to one or more other such sub-systems by the ECU.

In some embodiments, the systems and methods may include controlling wheel braking response according to at least one of an ABS and an ESC algorithm, wherein a state parameter of the active suspension system of at least one wheel transmitted from the active suspension system is an input to the algorithm of at least one of an ABS and an ESC. In some embodiments, the algorithm responsible for the operation of at least one of ABS and an ESC resides in a vehicle electronic control unit separate from the active suspension controller. In some embodiments, estimating a state includes an estimate of dynamic tire force variation. In some embodiments, estimating a state may be accomplished by measuring the output of, for example, without limitation, a wheel accelerometer, a pressure sensor, and a position sensor. In some embodiments, estimating a state may be accomplished by calculating an operating parameter of an active suspension system such as, for example, the velocity or torque of an electric motor in the active suspension actuator. In some embodiments, controlling the active suspension actuator in response to the received command includes coordination of control with timing of at least one of a pulsed brake control and a wheel (rotational) torque vectoring system. In some embodiments, the command from the electronic control unit on the vehicle responsible for at least one of anti-lock braking and stability control includes, for example, a change in status signal. In some embodiments, controlling an active suspension actuator includes increasing wheel damping. In some embodiments, controlling an active suspension actuator includes force vectoring on at least one of a plurality of active suspension actuators.

In some embodiments, the systems and methods disclosed herein may include, directly or indirectly, exchanging information between the active suspension system of at least one wheel and an ABS, an ESC system and/or another DAS subsystem to enable them to function cooperatively or synergistically. Functioning cooperatively means that the active suspension system of at least one wheel and at least one of a DAS sub-system operate such that their actions are synergistic. For example, the active suspension system of at least one wheel may, directly or indirectly, inform at least one of the ABS and the ESC that the wheel is bouncing, or that the wheel is not bouncing and a desired wheel force is being applied. The ABS and/or the ESC may then institute optimal braking procedures such as, for example, maximum stability or rapid stopping. Alternatively or additionally, the active suspension system of at least one wheel may be used synergistically to improve the effectiveness of an ESC system. For example, in the event that an ESC system detects a spin out when a vehicle is navigating a turn, it may communicate a request for additional wheel force at one or more wheels and/or convey information about one or more state parameters that would allow the active suspension system to detect a spinout or imminent spinout. The active suspension system of one or more wheels may then react by increasing the wheel force at the wheels where the ESC system will apply braking.

In some embodiments, the systems and methods disclosed herein may include a method of improving stability and/or performance of a vehicle by at least partially centrally controlling an active suspension system and at least one other DAS sub-system in order to coordinate their response to a road event.

In some embodiments, the systems and methods disclosed herein may include configuring a suspension system for vehicle safety. The method may include controlling suspension operation of individual wheels or a group of wheels of the vehicle with centralized or distributed, or a combination of centralized and distributed suspension systems. A centralized or distributed suspension system may also be networked. A centralized hydraulic suspension system is defined as a hydraulic suspension system wherein at least a portion of the hydraulic system is shared among two or more wheel-specific actuators. A distributed hydraulic suspension system is defined as a hydraulic suspension system wherein each hydraulic wheel-specific actuator has a dedicated hydraulic system. In some embodiments, hydraulic and electrical elements dedicated to operate with a single wheel-specific actuator are proximally disposed to the actuator or physically attached to it. An integrated wheel-specific hydraulic suspension system comprises an actuator and the dedicated electrical and hydraulic components configured as a single unit or in a single housing. A networked hydraulic suspension system is one where each wheel-specific actuator has a controller that communicates with the controller of at least one other wheel-specific actuator or a central controller.

The method may also include detecting at least one of wheel and vehicle body movement with wheel-specific sensors disposed with each of the individual actuators. The method may further include controlling an individual wheel, at least partially, in response to movement sensed by a plurality of the wheel-specific sensors. The method may further include obtaining vehicle safety condition data that is indicative of at least one of a current and an imminent vehicle safety condition violation. The method may also include communicating wheel-specific information and vehicle safety condition information among the individual networked suspension systems via a vehicle or suspension system communication network. Each networked suspension system may process information provided by its wheel-specific sensors to execute a wheel-specific suspension protocol to control the vehicle wheel with which it is associated. It also may process vehicle safety condition information to execute an overall vehicle-wide safety suspension protocol/strategy to cooperatively control vehicle motion in the presence of a vehicle safety condition violation. In some embodiments, the wheel-specific suspension protocol/strategy includes a frequency-dependent damping algorithm that causes different suspension control actions based on a frequency of wheel movement detected by the wheel-specific sensors.

In some embodiments, the method may further include cooperatively controlling vehicle motion with individual networked systems to reduce at least one of roll, heave, and pitch motion by communicating wheel-specific information between at least two individual networked suspension systems. In some embodiments, each wheel-specific suspension system includes an electronic control module, and an electro-hydraulic power pack configured to rapidly adjust a force on a wheel relative to a vehicle chassis and to a road surface. In some embodiments, each hydraulic distributed wheel-specific suspension system includes an electronic control module, a BLDC motor coupled to a hydraulic pump that controls hydraulic fluid flow through a plurality of chambers of a piston-based actuator. In some embodiments the electric motor and the hydraulic pump may be coaxially coupled though embodiments in which they are non-coaxially coupled are also contemplated. The hydraulic system further includes at least one passive valve between chambers of the piston-based actuator that at least partially closes at fluid flow velocity above a fluid flow threshold. In some embodiments, the communication network of the vehicle further facilitates two-way communication between the plurality of suspension systems and at least one DAS sub-system for exchanging vehicle safety condition-specific information.

In some embodiments, the systems and methods disclosed herein may include a method of delivering energy to an active suspension system. The method may include storing energy in an energy storage facility that is accessible to the active suspension system. The method may also include determining when a power demand of the active suspension system for a wheel or vehicle body event response exceeds an energy demand threshold. The method may include delivering energy from the energy storage facility to meet the power demand until the energy demand falls below the energy demand threshold, wherein the active suspension system operates as an active safety suspension system by adjusting at least a particular aspect of a vehicle to wheel relationship during a safety-related event. The method may further include an active suspension system that tracks energy usage and adapts a control regime to generate electricity through regeneration for delivery to a vehicle electrical bus so that net energy consumption of the active suspension system from the vehicle electrical bus is neutral. The active suspension system may operate as an active safety suspension system by adjusting at least a particular aspect of the vehicle to wheel relationship during a safety-specific event. Energy may be stored in, for example, a battery, a flywheel, an electrical capacitor, a hydraulic capacitor, or a pneumatic capacitor.

In some embodiments, the systems and methods disclosed herein may include a wheel-specific active suspension system. The system may include a controller for actively controlling an electro-hydraulic actuator in the presence of available power greater than a voltage fault threshold, wherein the electro-hydraulic actuator adjusts or defaults to operate in a nominally stiff passive suspension mode when the available power is below a voltage fault threshold. The active suspension system may operate as an active safety suspension system by adjusting at least a particular aspect of a vehicle to wheel relationship during a safety-specific event.

In some embodiments, the systems and methods disclosed herein may include a method of predicting energy storage requirements for a vehicle active suspension system. The method may include determining an energy usage rate for the suspension system. The method may also include determining a current available stored energy. The method may further include calculating a current suspension power factor. The method may include predicting energy storage requirements based on the energy usage rate, current available stored energy, power factor, and desired operator comfort factor. The method may include operating the suspension system as an active safety suspension system by adjusting at least a particular aspect of the vehicle to wheel relationship during a safety-related event.

In some embodiments, the systems and methods disclosed herein may include a vehicle high power electrical power bus. The power bus may include a bi-directional DC-DC converter capable of converting from a low voltage to a high voltage and from the high voltage to the low voltage. Any convenient low and high voltage values may be used although low voltage is typically approximately 12 VDC while high voltage is substantially higher, and typically approximately 48 VDC.

The power bus may also include an energy storage device coupled between the high voltage and the low voltage. The low voltage may be a vehicle primary electrical bus and the high voltage may be the high power electrical power bus. The power bus may further include a plurality of power consuming systems connected to the high power electrical bus, wherein at least one of the plurality of power consuming systems is an active suspension system also capable of providing energy to the high power electrical bus through regenerative action of the suspension system, wherein the active suspension system operates as an active safety suspension system by adjusting at least a particular aspect of the vehicle to wheel relationship during a safety-related event.

In some embodiments, the systems and methods disclosed herein may include an active suspension system integrated into a single actuator body. The system may include an electric motor. The system may further include a hydraulic pump operatively coupled to the electric motor. The system may also include a hydraulic actuator with a piston disposed in it, wherein fluid is communicated between the hydraulic actuator and the hydraulic pump through the body of the hydraulic actuator. The active suspension system may operate as an active safety suspension system by adjusting at least a particular aspect of the vehicle to wheel relationship during a safety-related event. "Hydraulic motors" can typically be used as hydraulic motors or hydraulic pumps. "Electric generators" can typically be operated as electric generators or electric motors.

In some embodiments, the systems and methods disclosed herein may include an active suspension system for a vehicle. The system may include actuators disposed between a vehicle body and each vehicle wheel. The housing of each actuator may include a hydraulic motor that produces at least one of variable flow and variable pressure and an electric motor that is controlled to directly control wheel movement by controlling the hydraulic motor. The active suspension system may operate as an active safety suspension system by adjusting at least a particular aspect of the vehicle to wheel relationship during a safety-related event.

In some embodiments, the systems and methods disclosed herein may include a method of reducing energy consumption in a suspension system. The method may include determining a set of detectable events that produce movement of a suspended body greater than a perception threshold. The method may also include adjusting operation of the suspension system so that suspension actions taken in response to events that are not in the set of events consume power below a first power consumption threshold. The method may further include adjusting operation of the suspension system so that suspension actions taken in response to an event in the set of events consume power sufficient to maintain suspended body movement below the perception threshold. The method may include operating the suspension system as an active safety suspension system by adjusting at least a particular aspect of the vehicle to wheel relationship during a safety-specific event.

In some embodiments, the systems and methods disclosed herein may include a method of controlling an active suspension system. The method may also include taking a dynamic model representing in-plane and out-of-plane dynamics of the vehicle. The method may further include taking road-related inputs including estimated road coefficient of friction, overall road conditions, and suspension roll angle. The method may include generating an estimate of a plurality of states of the vehicle. The method may also include calculating a required suspension force based on those estimates. The method may further include summing the required suspension force with the existing force. The method may include applying the summed force to the vehicle suspension system. The method may further include operating the suspension system as an active safety suspension system by adjusting at least a particular aspect of the vehicle to wheel relationship during a safety-specific event.

In some embodiments, the systems and methods disclosed herein may include an active vehicle suspension system for providing a suspension function for a wheel of a vehicle. The system may include an electric motor. The system may also include a hydraulic pump operatively coupled to the electric motor. The system may further include an electronic controller that controls the torque and the speed of the electric motor. The system may include a power throttling algorithm executable by an electronic controller for handling vehicle dynamics while managing vehicle power consumption, wherein the active suspension system operates as an active safety suspension system by adjusting at least a particular aspect of the vehicle to wheel relationship during a safety-related event.

In some embodiments, the systems and methods disclosed herein may include an active vehicle suspension system. The system may include a substantially elongated housing. The housing may include an electric motor. The system may include a hydraulic pump operatively coupled to the electric motor so that rotation of the electric motor drives rotation of the hydraulic pump. The system may also include an electronic controller that controls at least one of torque and velocity in the electric motor. The system may further include one or more sensors, wherein the active suspension system integrates with other vehicle control/sensing systems such as, for example, GPS, self-driving, regenerative braking, and sensing and wherein the active suspension system operates as an active safety suspension system by adjusting at least a particular aspect of the vehicle to wheel relationship during a safety-related event.

In some embodiments, the systems and methods disclosed herein may include an active vehicle suspension system. The system may be configured to store a historical record of the performance and response characteristics of one or more suspension components, such as for example, an actuator. This collected data may include, for example, the torque generated by the electric motor as a function of various vehicle operating conditions and environmental conditions. The collected data may also include, for example, hydraulic motor speed, power produced by an actuator (instantaneous and average), power consumed by an actuator (instantaneous and average), vehicle body acceleration, pressure in the damper, hydraulic oil temperature, steering wheel position, damper position, vehicle position (yaw, etc.), brake pedal position, and wheel speed (linear and angular). Collected data may be in the time or frequency domain. Data collected at a certain point in time may be compared, for example, to data collected at an earlier time, to data collected after repairs or component replacement, data factory-stored in a lookup-table, and/or to data collected when the vehicle was new. Data collected at one wheel may be compared to data collected at one or more other wheels. For example, the data collected at a back wheel may be compared to data collected at a front wheel on the same side of the vehicle after a time offset that is dependent on vehicle speed. Based on these comparisons, various flags may be set, warning lights illuminated, and/or other warning devices used to inform the driver or repair mechanic about possible malfunction or faulty operation of a system component.

In some embodiments, the systems and methods disclosed herein may include an active vehicle suspension system. The active suspension system may also be configured to compensate for the degraded performance of one or more components. For example, if it is determined that there is increased leakage in a hydraulic pump, the system may cause the pump to operate at higher speeds under certain operating conditions to compensate for the leakage.

In one embodiment, the active safety suspension system comprising multiple actuators is configured to detect a fault condition or abnormal operation of one or more actuators. Abnormal operation of an actuator may be caused by, for example, loss of partial or total power to the actuator controller, degradation of actuator, communication breakdown between various elements of the system and/or sensor malfunction. This abnormal operation may lead to undesirable or unsafe vehicle performance, such as for example, understeering or over-steering. Upon detecting an abnormal operation of an actuator, the active safety suspension system may alter the operating characteristics of one or more other active suspension actuators to compensate for the underperforming unit. For example, if due to the loss of power to one actuator controller, that actuator begins to perform as a semi-active or passive shock absorber, then the system may place one or more of the other actuators into a semi-active or passive mode, respectively.

In some embodiments, the systems and methods disclosed herein may include an active vehicle suspension system. The active suspension system may be configured to introduce certain motions to the vehicle body to communicate with one or more vehicle occupants. A vehicle may be configured to detect a risky maneuver, such as for example a lane change when the appropriate turn signal is not properly activated, or if a "blind spot" detection system determines that a lane change may be unsafe. The vehicle may be further configured use the active suspension system to produce one or more signals to warn vehicle occupants. Signals may include, for example, perceptible vibration of at least a portion of the vehicle, or a rumbling noise. This mode of communication may be used in addition to or instead of other signals such as audible, tactile, haptic or visual alarm signals.

In some embodiments, the active suspension system may be configured to detect instances when one or more components of the system are being used improperly or beyond safe operating limits. The vehicle may be configured use the active suspension system to produce one or more signals to warn vehicle occupants. Signals may include, for example, perceptible vibration of at least a portion of the vehicle, or a rumbling noise. This mode of communication may be used in addition to or instead of other signals such as audible, tactile, haptic or visual alarm signals produced by the active suspension system.

In some embodiments, a suite of sensors are used to measure one or more vehicle body parameters such as, for example, steering wheel position, vehicle speed, vehicle acceleration, yaw and yaw rate, as well as, one or more vehicle wheel parameters, such as for example, wheel angular speed, wheel angular acceleration, and vertical displacement, velocity and acceleration of the vehicle wheel relative to the road and the vehicle. Data from the measurement of one or more such quantities, a vehicle kinematic model and a model of at least a portion the suspension system, may be used to compute the torque to be applied to the steering wheel by the EPS electric motor to provide the proper or desired feedback, i.e. road feel, to the driver. The controller may then be used to command the electric motor to produce that torque.

For example, various suspension system parameters may be measured during operation by using various sensors. Such parameters may include, for example, the vertical position, velocity and acceleration of a vehicle wheel with respect to the vehicle body (a suspension state). This information in conjunction with information from steering wheel/steering column sensors may be supplied to a steering behavior model to calculate a compensation steering torque. The compensation steering torque may be an assistive torque enacted by an EPS system, or a change in steering position, enacted by an active steering system that can add or subtract steering angle. Alternatively a controlled hydraulic power steering (HPS) may be similarly assisted to compensate for certain effects of an active suspension system.

The steering behavior model predicts how the positional and other changes induced by the active suspension system would be translated into undesired torques in the steering wheel and changes in vehicle slip angle or yaw behavior that would be perceived by the driver. Once predicted by the model, the EPS and/or active steering ECU could act to neutralize or mitigate these effects. The model may be based on mathematical simulations of the suspension/vehicle system. Alternatively or additionally the model may be empirical. Empirically based models may be developed by, for example, the vehicle manufacturer or system integrator during the development or manufacturing process by calibrating the response of the suspension system to various inputs at various operating conditions and measuring the effect at the steering wheel. During use, the EPS and/or the active steering system may then be programmed to negate these effects at the steering wheel. Alternatively or additionally, the steering model may be developed or fine tuned during the use of the vehicle. This may be achieved by setting predetermined thresholds for objectionable steering system behavior. During use of the vehicle, whenever objectionable behavior is detected or indicated by the driver, the state of one or more elements of the vehicle/suspension system is noted. Thereafter, whenever, that or similar state is detected, the model assumes that the same undesirable behavior is likely to occur at the steering wheel and effectively institutes the proper countermeasures to compensate.

In some embodiments, a kinematic model of the vehicle and/or the suspension system may be used to, for example, predict the steering effects induced by differential vertical motion of one or both left side wheels with respect to the corresponding right side wheels in relation to the vehicle. A typical vehicle suspension allows the wheels to move more freely along a path that is close to normal to the road, in order to best absorb road imperfections and not transmit them to the vehicle. This path is prescribed by the elasto-kinematics of the suspension. The suspension is designed in such a way that the typical motion path of the wheels with respect to the body is in general substantially less constrained than any other motion of the wheel, allowing in general the consideration of the wheel as moving de facto along that path under normal road input. This path will in general describe a three-dimensional arc that forces the wheel contact patch to move side-side, fore-aft, and rotate with respect to the vehicle as the wheel moves relatively to the vehicle body. This path can be described by those of skill in the art by using such terms as bumpsteer (for the amount of wheel steering induced as a result of pure up-and-down motion of the wheel with respect to the vehicle) and track-width change (for the amount of lateral motion of the tire contact patch as a result of pure up-and-down motion of the wheel with respect to the vehicle).

Furthermore, many vehicles contain front and/or rear anti-roll bars, which cross-couple the wheels of the vehicle such that a vehicle roll event creates a force on the wheels of each side of the vehicle in order to mitigate vehicle body roll. These roll bars may further be tuned to provide suspension characteristics such as damping and on-center roll feel. In the case of an active suspension, the roll bars may be removed, downsized (more compliant), or hysteretic (with a dead-band in the center), and these changes may reduce and/or alter the steering feel of the vehicle. According to one aspect, a vehicle containing an active suspension system and an undersized or non-existent roll bar may actively control a feed-forward steering torque in order to at least partially counteract negative or undesirable steering effects from the lack of the roll bar.

The purpose of a vehicle suspension system is typically to isolate the vehicle body, and thus the occupants, from the road. This leads to a relative motion of the vehicle with respect to the road, and thus to vertical motion of the wheels with respect to the vehicle body. The relative vertical motion between the wheels and the vehicle body is in general more pronounced the more isolated the vehicle body is from disturbance as a result of road irregularities. Because of the increased relative motion, the steering system of a vehicle with an active suspension may be more susceptible to road induced disturbances that may be more likely to be perceived by a driver than for most passive suspension systems, though the problem exists in both types of systems.

In some embodiments, the elasto-kinematic motion of a number of wheels with respect to the car body may be measured directly, by means of, for example, sensors on the wheel and body, or indirectly, by measuring the vertical motion of the suspension or of the wheel, and forces resulting on the suspension links, and inferring the predetermined kinematic motion of the wheel. The effect of the kinematic motion on the steering behavior of the car, through steering torque, yaw angle, or yaw rate, for example, can thus be predicted or measured, and a counteracting or compensating input commanded to the EPS and/or the active steering system in order to maintain the desired directionality of the vehicle and road feel, or more generally to reduce the effect of road disturbances on the driver's perception.

In some embodiments, the vertical wheel motion may be measured or predicted through the use of suspension position sensors, and the lateral motion and kinematic steering of each wheel is calculated from a lookup table or function measured, for example, on a standard kinematics-and-compliance (K&C) test rig. Alternatively, this lookup table or function may be calculated computationally using the know suspension geometries, as the disclosure is not limited in this regard. The total added slip angle due to these two effects (kinematic steer and kinematic lateral motion of the patch) is then input into an in-plane dynamics model of the vehicle (often called a 'bicycle model') to predict the effect on the lateral motion and yaw behavior of the vehicle, and an appropriate countermeasure is calculated in terms of added steering angle to the front, and where present or necessary, rear steering actuators or in terms of steering torque as felt by the driver, and sent to the EPS and/or the active steering controller. This allows the vehicle to track better when driving on roads with varying camber (side-side tilt of the road) while isolating the vehicle from the road, and creates a more natural feeling for the driver.

In some embodiments, when the active suspension controller determines how it is to respond to a particular stimulus, as characterized by one or more sensors, it also provides information to the EPS and/or the active steering system about the anticipated state of the suspension system. The anticipated state of the suspension system may be based on a predictive model of the suspension system. The model may predict the anticipated posture the suspension system will likely attain in the near future, for example, based how the values of certain parameters and their rates of change. Based on these predictions the controller may command of the EPS and/or the active steering system to prepare to respond. Such a response may be to modify steering response from the driver input, to modify steering angle of the vehicle wheels, or both. For example, the EPS system may compute what torque needs to be applied to the steering wheel to achieve the desired "road feel" with the new suspension posture at a point in the future. The EPS then commands the EPS controller to apply the proper torque at the proper time.

In some embodiments, a signal from an active suspension controller may affect steering response of the vehicle via the EPS ECU, such that during certain control modes of the active suspension, the EPS becomes more responsive to small inputs from the driver via the steering wheel.

The steering and suspension systems of conventional vehicles are typically tuned to behave in a manner, during normal driving, that is perceived by drivers to be natural and desirable. For example, when a vehicle navigates a turn in a road, the vehicle body rolls in response to lateral forces. The difference in motion of the inside and outside wheels relative to the vehicle body and the forces that, for example, act on the suspension and steering systems during the turn, typically induce a desirable restoring torque in the steering system. However, when an active suspension system is used to intervene during a turn to eliminate, minimize, or alter the amount of roll, it may also alter the elasto-kinematics of the vehicle. Therefore, the inventors have recognized that while this intervention to curtail vehicle roll increases the comfort of the occupants and even the driver, it curtails or eliminates certain desirable effects, such as, for example, the restoring steering torque.

In addition to the above, the inventors have recognized that the absence of the above noted restoring steering torque may make the behavior of the steering system seem unnatural and off-putting. Therefore, in some embodiments it may be desirable to provide both the beneficial effects of using an active suspension system in roll mitigation during a turn while at least partially mitigating, and/or eliminating, other undesirable side-effects. This may be accomplished in a number of ways as described herein. However, in some embodiments, the operation of the active suspension system may be coordinated with the EPS and/or the active steering system to help mitigate undesirable side-effects. For example, the EPS and/or the active steering system may be used to produce the restoring steering torque that would normally be present in a vehicle with a conventional suspension system during a turn. Therefore, the EPS and/or the active steering system may be used to compensate for the altered elasto-kinematics of the vehicles suspension system and provide a more desirable total steering response when an active suspension is used to mitigate vehicle roll. For example, the magnitude of this restoring steering torque may be, at least partially, based on the relative position of one or more of the wheels of the vehicle with respect to the body though other parameters including, but not limited to, steering angle, accelerometers, vehicle speed, and other appropriate inputs may be used to help determine appropriate restoring torques to be applied during a turn.

When an active suspension system is used to keep a vehicle level as it, for example, travels over undulations in the road, a similar perception problem associated with forces transmitted through the steering system to a driver may occur. Similar to the above, these forces are due to the interventions of an active suspension system changing the response of the wheels relative to the vehicle body. Therefore, while the active suspension system may shield vehicle occupants from road induced vertical movement of the vehicle body, the relative motion and response change of the wheels may result in slight slaloming, moving laterally side-to-side or weaving of the vehicle as it travels down a path. This response may be more pronounced than in a conventional vehicle exposed to the same road disturbances. Additionally, this weaving can be unpleasant for the driver and/or other occupants. However, similar to the above, the EPS and/or the active steering system may also be used to cancel these lateral motions by compensating for them so that the occupants do not perceive, for example, such a weaving motion. The EPS and/or the active steering and active suspension systems at each wheel may be used in coordinated synergistic fashion with the EPS and/or the active steering system to achieve this result. This may be achieved by exchanging information between an EPS and/or active steering controller and one or more active suspension controllers. Alternatively or additionally, a central controller may be used to collect information about the elasto-kinematic state of the suspension and to adjust the steering system performance accordingly.

As has been discussed, active suspension system actuators react effectively and rapidly to road conditions including various surface irregularities. One or more actuators may be used to lower or raise the vehicle, for example, in anticipation of a crash, to pass over an obstruction, for load leveling or to adjust ride height. Using the actuators for this purpose results is at least a portion of the overall travel capacity (stroke) of the actuator to be lost. Furthermore, maintaining the height differential in this manner also results in continuous energy consumption that detracts from the overall system efficiency.

In some embodiments, a secondary actuator may be provided in addition to a primary actuator in order to independently adjust vehicle height. In some embodiments of an active suspension system, the secondary actuator share certain elements of the active suspension system infrastructure with the primary actuator to reduce cost and overall system complexity. For example, in a hydraulic active suspension system, the same hydraulic motor/pump may be used to alternatively or simultaneously drive the primary active suspension actuator as well as the secondary height adjustment actuator.

In some embodiments, the primary actuator is constructed and configured to operate as a semi-active or passive shock absorber during the period when the motor pump is used, in conjunction with the secondary actuator, to adjust vehicle ride height. In yet another aspect, the secondary actuator may be locked in position when the proper vehicle height setting is achieved.

In some embodiments, ride height in a vehicle, for example a vehicle with a hydraulic active suspension system, is adjusted by adjusting average system operating pressure. Typically, the area that is exposed to fluid pressure on the front face of the actuator piston is different than the area on its rear face. The area of the rear face, where it is connected to the piston shaft, that is exposed to pressure is typically smaller by an amount equal to the shaft cross-sectional area. By adjusting average system operating pressure, mean net force applied to the piston by the fluid may be varied and the vehicle ride height adjusted.

In some embodiments, an active suspension system of at least one wheel is configured to communicate a message to a person. A detector may be used to determine the existence of a particular situation which requires information to be communicated to a person. The active suspension system of at least one wheel may be used to induce a predefined motion in or of the vehicle body which may be perceived visually or sensed and interpreted by the person. For example, a lane departure detection system may be used to determine that a vehicle is drifting out of the lane of travel. It may additionally be determined that the appropriate turn signal has not been activated or that a lane change may result in a dangerous situation, such as for example, a collision with another car. Once such a situation is identified, the vehicle operator or other occupant of the vehicle may be informed of the situation. For example, active suspension systems of one or more wheels can be activated to warn occupants of the vehicle by simulating traveling over a rumble strip. This may be accomplished by using the active suspension system to cause the vehicle to vibrate and/or move as if it is traveling over a rumble strip. The information communicated to a person in the vehicle may be that the vehicle is about to leave the lane of travel.

In some embodiments, an active suspension system of at least one wheel is configured to communicate a message to a person outside the vehicle. For example, a detector may be used to detect that a particular key fob is being used to gain access to the vehicle. The vehicle's response may include, for example, a gesture that resembles kneeling. To perform this gesture and communicate the greeting, the active suspension system may be used to adopt a posture where one corner of the vehicle is lower than the other corners. Alternatively or additionally other gestures may be used such a high frequency vibration as a greeting or message that the vehicle is at its destination or needs to be refueled.

Alternatively or additionally certain movements may be induced in the vehicle body to direct the attention of one or more occupants to another communication device for additional information. It should be understood that the various movements and gestures noted above may be accomplished by actuating one or more actuators of the active suspension system either together, singly, in succession, or in any other appropriate manner to produce the desired gesture or movement. The gestures may be preprogrammed by the vehicle manufacturer, selected or designed by a vehicle operator by, for example, using a user interface. Using one or more active suspension systems to communicate information may be in addition to or instead of other means of communicating information to a person, inside or outside the vehicle, such as for example using a sound source, a light source, and/or a tactile signal generator.

In some embodiments, an active suspension system of at least one wheel is configured to mitigate the possibility of a vehicle rollover. In some embodiments, active suspension systems of two or more wheels may exchange information, directly or indirectly, and/or work synergistically with each other to improve vehicle safety, stability, performance and/or responsiveness. Alternatively, or in addition to the above, an active suspension system may exchange information, directly or indirectly, and/or work synergistically with one or more other systems in a vehicle to, for example, improve vehicle safety, stability, performance and/or responsiveness. The other systems may be, for example, a DAS sub-system or a vehicle ECU. The synergistic effect may include, for example, improved safety, increased stability, improved braking, increased roll-over prevention, enhanced steering response, increased comfort and/or driving experience.

In some embodiments, an active suspension system of one or more wheels may be used to adjust or alter the dynamics and/or the response of a vehicle by interacting synergistically with at least one additional sub-system. Information may be exchanged among one or more active suspension systems and the at least one other sub-system, such as for example, without limitation, an ABS (Anti-lock Braking System), an EPS (Electric Power Steering) system, a hydraulic power steering system, an ESC (electronic stability control) system, an automatic braking system, an active steering system and a rear steering system. The synergistic reaction of an active suspension system and at least one other system may be in response to a road event, which may involve operator intervention. A road event may include, for example, hitting a pothole or other obstruction, braking, navigating a turn, avoiding an obstruction, avoiding a rollover, avoiding a spin out, experiencing reduced traction, such as due to ice, and avoiding an imminent collision. One or more active suspension systems may work synergistically with other systems during a portion or during an entire road event. The synergistic operation may involve the sharing of sensors, may involve direct communication among systems over a network and/or indirect communication by means of one or more vehicle microprocessors. Two or more systems operating synergistically achieve more than the same systems can produce independently.

In some embodiments, an active suspension system of a vehicle comprises a plurality of actuators capable of operation in at least three operational quadrants, each of the plurality of actuators capable of being individually controlled in order to create a force on its corresponding wheel in at least one axis; and a controller that can produce a response to a road event in coordination with at least one of an anti-lock braking system and a stability control system, wherein the traction of at least one wheel during the event is improved relative to the traction at the wheel without the intervention of the active suspension system.

In some embodiments, a method is used to improve the stability performance of a vehicle using an active suspension system, comprising estimating a kinematic state in at least the axial direction of suspension travel of at least one wheel using an active suspension actuator and/or a sensor; transmitting information about the kinematic state from the active suspension to an electronic control unit on the vehicle that is responsible for at least one of anti-lock braking and stability control; receiving a command and/or information from the electronic control unit; and controlling an active suspension actuator at least partially in response to the received command and/or information.

In some embodiments, a method is used to improve vehicle safety by exchanging information with at least one active suspension system and one DAS sub-system and a vehicle microprocessor.

In some embodiments, a method is used to improve vehicle safety comprising controlling operation of at least one wheel of a vehicle with an active suspension system wherein the system has at least one controller, providing a separate system at least partially for improving vehicle safety, communicating between the at least one controller of the active suspension system and the separate system, and using information exchanged with the separate system to the to improve performance of the active suspension system and/or the separate system.

In some embodiments, a method comprising using an active suspension system of a vehicle to communicate with a person by using a detector in the car to determine that a particular situation exists, using an active suspension system to induce a predetermined motion to a vehicle body, using the predetermined motion to communicate information to a person about the situation. The situation may be, for example, the drifting of a first vehicle out of a driving lane, where one or more occupants of the vehicle are informed of the situation by using at least one active suspension system of at least one wheel to simulate traveling over a rumble strip. The method may further comprise using a detector to detect an approaching second vehicle with which a first vehicle would likely collide if a lane change were to occur. Using at least one active suspension system of at least one wheel of the first vehicle to induce a predetermined motion in the vehicle body of the first vehicle to inform an occupant of the first vehicle of the approaching second vehicle.

In some embodiments, a method comprising using an active suspension system of a vehicle to communicate with a person. The communication may comprise recognizing a person outside the vehicle, for example, by receiving a signal from key fob associated with the person, and acknowledging the person by using the active suspension system to move the vehicle in a predetermined manner. The predetermined motion may, for example, simulate kneeling by for example lowering a corner of the vehicle or by rocking from side to side.

In some embodiments of an active suspension system of a self-driving vehicle, the active suspension is used to communicate the output of an algorithm or model to a person by causing a predetermined motion of the vehicle.

In some embodiments an active suspension system of a self-driving vehicle is used where a second communication device is available to communicate with a person wherein the second communication device is selected from a group consisting of a sound source, a light source, and a tactile signal generator. The two signaling systems may be used jointly or independently of each other.

In some embodiments an active suspension system is used to reduce the possibility of vehicle rollover or to facilitate recovery from a rollover avoidance maneuvers. In the case where an imminent rollover situation is detected, for example, as a result of a projected collision of one or more wheels with a rollover trip, the active collision system may be used independently, in coordination with other systems, or synergistically with other systems to reduce the likelihood of a vehicle rollover or to prevent a vehicle rollover. A trip may be any obstruction or irregularity on a road, such as for example a rock or a curb, that may induce a rollover if struck by one or more wheels of a vehicle. The method may include, for example, determining information such as: the position, posture, velocity and acceleration of the vehicle, the position and steering angle of one or more wheels such as, for example the first wheel that is projected to strike the rollover trip, the wheel force of one or more wheels, the position of the rollover trip relative to the vehicle and the projected time of collision of at least one wheel with the trip. The active suspension system may be used to apply a force impulse to one or more wheels to induce a properly timed angular acceleration in the vehicle body, which may be about the vehicle's longitudinal axis, opposite in direction to the anticipated rollover, just prior to the projected time of collision of one or more wheels with the trip. The impulse may be timed such that the maximum angular momentum countering the anticipated rollover occurs, as nearly as possible, at the projected time of collision of at least one wheel with the trip. The method may include determining the dynamics of the lateral movement of the vehicle by using one or more sensors to detect, for example, actual lateral acceleration and comparing the measurement with an expected lateral acceleration based on the vehicle speed and steering angle. The method may also include determining the position of the trip by, for example, using a ranging system to locate the trip relative to the vehicle and to estimate the time of collision by using the optical data in conjunction with computing the trajectory of the vehicle. The ranging system may include one or more sensors such as, for example, an acoustic sensor, a LiDAR sensor, a radar detector and a camera with side-view capability. The distance can be estimated either using stereo vision or monocular vision with distance interpolation, and then a sensor capable of estimating vehicle velocity (including lateral) such as an IMU to predict time to impact with the trip. Additionally or alternatively, the active suspension may be used to reduce the loading on the wheel approaching the trip or, if possible, to lift that wheel off the ground prior to the wheel striking the trip.

In some embodiments, an active suspension system is used to reduce the possibility of vehicle rollover by cushioning and/or stabilizing a vehicle when the vehicle is righted by a rollover avoidance maneuver. In situations where a vehicle rollover may be imminent, for example, if the wheels on one side of a vehicle lose contact with the road surface and become elevated, correction maneuvers may cause the vehicle to right itself. An active suspension system may be used to damp the motion of the vehicle body as the elevated wheels strike the road surface, in order to avoid a rollover in the opposite direction.

In some embodiments an active suspension system may be used to improve safety before and/or during a collision by changing the posture of a vehicle so as to mitigate damage to the vehicle as a result of an accident. A method for improving safety may include estimating a projected time of a collision with an object; and using an active suspension system to change vehicle posture in preparation for an imminent crash. Alternatively or additionally the method may include using the active suspension system independently, in coordination or synegistically with another system, such as for example, a DAS sub-system, to alter wheel force of one or more wheels in order to improve traction to improve braking and maneuverability of the vehicle prior to, during and/or after the collision.

In some embodiments an active suspension system may be used to improve safety by determining the presence of an object on the road; determining that collision with the object is imminent; identifying the object; using an active suspension system to adjust the posture of the vehicle before a collision occurs at least based on the identification. The method may include adjusting the posture of the vehicle at least based on the size and weight of the object. The method may also include determining if the object is a pedestrian and adjusting the posture of the vehicle to mitigate injury to the pedestrian.

In some embodiments a vehicle includes an active suspension system comprising a plurality of actuators capable of operating in at least three modes corresponding to quadrants of operation, at least one sensor that is capable of detecting at least one condition indicative of an imminent collision of the vehicle with an object; and a controller adapted to accept data about the condition detected by the at least one sensor and to cause the controller to control at least one of the plurality of actuators in order to change a ride height of the first vehicle while simultaneously controlling motion of a wheel connected to at least one of the plurality of actuators, thereby substantially simultaneously controlling wheel force and ride height leading up to the imminent collision.

In some embodiments a method comprises operating a vehicle is configured with at least two wheels; using at least one sensor to detect loss of traction in a first wheel, using an active suspension system to increase the wheel force of the first wheel from a first level to a second higher level over a desired period of time. The method may also include reducing the wheel force of the first wheel from the second higher level. In some embodiments, the period over which the force is increased from the first level to a second level is less than or equal to half the period of the natural frequency of the vehicle body. For passenger cars the natural frequency is approximately 1-2 Hertz. The method may further comprise using at least one sensor to detect loss of traction in a second wheel and using an active suspension system to increase the wheel force of the second wheel.

In some embodiments of an active suspension system of a vehicle with at least four wheels, a method is used to alternately increase the wheel force of pairs of wheels located on opposite corners of the vehicle to improve wheel traction. The method comprises increasing the wheel force at a first wheel and a second wheel, located at an opposing corner from the first wheel, from a first value to a second higher value, and using an active suspension system to then reduce the wheel force, of the first wheel and a second wheel, back to the first value. The method further comprising using the active suspension system to increase the wheel force, of the third wheel and a fourth, which is located at an opposing corner from the third wheel, from the first value to the second value while the wheel force at the first wheel and the second wheel are being reduced from the second value to the first value. The method may further comprise maintaining the sum of all the wheel forces applied at the four wheels, during a road event, at a value approximately equal to the vehicle weight at any instant in time. In some embodiments, the range of variation of the sum of all wheel forces, during a particular road event, is less than ±20% of the vehicle weight, less than ±10% of the vehicle weight, than ±5% of the vehicle weight or less than ±1% of the vehicle weight.

In some embodiments a method comprises using the active suspension to mitigate the effect of a tire blowout, the method comprising using a tire blowout detector to detect a tire blowout at a wheel of the vehicle, controlling the active suspension actuator disposed at the wheel with the tire blowout condition to rapidly alter the wheel force. The method may also comprise altering the wheel force on the wheel with the blowout condition by applying a rapid lifting force.

In some embodiments a method includes using the active suspension and at least one other coexisting system in a vehicle in response to or during a road event. The coexisting system may be, for example without limitation, an anti-lock braking system, an electric power steering system, electronic stability control system, an active steering system, an automatic braking system, a hydraulic power steering system, and a four wheel steering system. Certain of these other coexisting systems, such as for example, an active steering system and an electric power steering system may be distinct units or may be combined into a single unit. The active suspension system and one or more of these systems may exchange certain information in order to control vehicle motion (which may include vehicle body motion and/or wheel motion) during at least a portion of the duration of a road event. The communication between any two systems may be bi-directional or unidirectional. The active suspension system and one or more of these systems may also work cooperatively and/or synergistically during at least a portion of the duration of the road event. Any two systems may exchange information in order to work cooperatively but not necessarily synergistically. For example, the anti-lock system and the active suspension system may work cooperatively by exchanging wheel force information and/or other information from which the maximum traction force can be determined so that the brakes can be applied at an optimal time to, for example, minimize stopping distance. Additionally or alternatively the active suspension system and anti-lock system may work synergistically when the automatic suspension system receives a request from the anti-lock braking system for the wheel force to be increased. The anti-lock braking system may then apply the brakes when it receives confirmation that a particular wheel force has been achieved. Road events may include, for example and without limitation, hitting a pothole, traveling over an ice patch, traveling over a road surface covered with oil, traveling over a speed bump, braking, navigating a turn, avoiding an obstruction, mitigating a rollover, preventing a rollover, preventing a spin out, experiencing reduced traction for least at one wheel, and avoiding an imminent accident or collision. The active suspension system and one or more of the other coexisting systems may work concurrently during at least a portion of the duration of the road event or during different segments of the duration of the road event.

The active suspension system and at least one other coexisting system may work cooperatively and or synergistically during an entire road event or during a portion of the road event. The road event may be, for example, navigating a turn and the active suspension system may be used to keep the vehicle level while the electric power steering and/or active steering is used to apply self-aligning torque to mitigate steering angle fluctuations induced by undulations or other irregularities in the road. The self-aligning torque may be determined based on kinematic or elasto-kinematic models of the suspension system, the steering system and/or interactions between them. Alternatively or additionally the compensating torque may be based at least partially on information supplied by the active suspension system to the power steering and/or active steering system, for example about the state of the suspension system. The information may include, for example, wheel position, wheel angular acceleration, angular wheel velocity and wheel force.

In some embodiments a vehicle may comprise an active suspension system and a coexisting system selected from the group consisting of anti-lock braking, electric power steering, electronic stability control, active power steering, automatic braking, hydraulic power steering, and four wheel steering. The active suspension system and at least one coexisting system are configured to exchange information which may be direct or indirect. The active suspension system and the at least one coexisting system may be operated synergistically or cooperatively during at least a portion of the duration of a road event based at least partially on the information exchanged.

In some embodiments a vehicle comprising an active suspension system is typically configured to minimize the impact of road surface irregularities on the occupants of a vehicle traveling over them, to the maximum extent possible. However, certain irregularities are intentionally introduced in roads to, for example, prevent speeding or warn drivers of a hazardous condition. For example, speed bumps and raised crosswalks are used to discourage speeding, while rumble strips are incorporated in a road surface to warn drivers that may be drifting off a road. A vehicle with active suspension may reduce the effectiveness of such safety measures by masking their intended effect from vehicle occupants. A vehicle with an active suspension may be configured with a detector to determine that the vehicle is about to travel over such structures and to warn the driver. Alternatively or additionally, the effectiveness of the active suspension system of a vehicle traversing such structures may be automatically, partially or fully, disabled so that the occupants of the vehicle are exposed to the intended effects of such structures.

In some embodiments, the systems and methods disclosed herein may include a method of operating a vehicle with an active suspension system and a brake activation system, which includes a determination that a braking demand event is in progress, and that additional traction force is required during the braking demand event. The active suspension system may be used to adjust the vertical component of the wheel force at a wheel to increase average traction force at one or more wheels during the braking demand event. The brake activation system may be, for example, an anti-lock braking system, an electronic stability control system, an automatic braking system, and a brake pedal of the vehicle which may be used to apply the brakes at least at one wheel during the braking demand event. These systems may be used individually or in various combinations to pulse the brakes during a braking demand event. The active suspension system may be used to pulse the wheel force at a wheel. The wheel force and the brakes may be pulsed, for example, at the same frequency, at different frequencies, at constant or variable frequencies, in phase with one another, or with a relative phase delay. In some embodiments the phase delay may be in the range of 1 degree to 10 degrees.

In some embodiments, the systems and methods disclosed herein may include a method of operating a vehicle with an active suspension system and a steering adjustment system to at least partially control steering behavior of the vehicle. The method includes determining the elasto-kinematic state of at least a portion of the active suspension system and determining the effect of the elasto-kinematic state of the at least a portion of the active suspension system on the steering behavior of the vehicle. The method further includes using the steering adjustment system to lessen the effect of the elasto-kinematic state.

In the above described embodiments, a steering adjustment system may be, for example, an electric power steering system, an active steering system, a rear steering system, an electro-hydraulic power steering system, a combination of an electric power steering system and an active steering systems, or a combination of power steering system, active steering system and rear steering systems. The elasto-kinetic state may be based, for example, on at least one of the following parameters: position of a wheel relative to the vehicle body, wheel force at a wheel, vehicle speed, lateral force at a wheel, velocity of a wheel normal to the road surface, and road wheel steering angle. The effect of the elasto-kinematic state may include, for example, one or more of the following parameters: road induced oscillations of the vehicle steering system, slaloming of the vehicle, inadequate steering wheel return torque, dead-band at mid-range of steering wheel. The elasto-kinematic state may depend, at least, partially on a measurement obtained by using a sensor. The elasto-kinematic state depend at least partially on an elasto-kinematic model of the active suspension system. The model may be, for example, an empirical model, a mathematical model or a combination of the two.

It should be appreciated that the foregoing concepts, and additional concepts discussed below, may be arranged in any suitable combination, as the present disclosure is not limited in this respect. It should be further understood, that the disclosure is not limited to the precise arrangements, variants, structures, features, embodiments, aspects, methods, advantages, improvements, and instrumentalities shown and/or described. Additionally, the various arrangements, variants, structures, features, embodiment, aspects, methods, and instrumentalities may be used singularly in the system or method or may be used in combination with other arrangements, variants, structures, features, embodiment, aspects, methods, and instrumentalities. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3A depicts the operation of an embodiment of an active safety suspension system detecting an impending collision.

FIG. 3B depicts the system adjusting vehicle attitude in anticipation of the collision.

FIG. 4A depicts the vehicle approaching a low friction patch where the vertical components of each of the four wheel forces are equal to each other.

FIG. 4B depicts the vehicle where only the left front tire is in contact with the low friction patch and where the wheel forces are still equal.

FIG. 4C depicts the vehicle where only the left front tire is in contact with the low friction patch and where the front two wheel forces have been increased.

FIG. 4D depicts the vehicle where only the left rear tire is in contact with the low friction patch and where the rear two rear wheel forces have been increased.

FIG. 4E depicts the vehicle where the tires are no longer in contact with the low friction patch and where all the wheel are again equally loaded.

FIG. 5A depicts the vehicle approaching a low friction patch where all four wheels are loaded equally.

FIG. 5B depicts the vehicle where only the left front tire is in contact with the low friction patch and where the left front and right rear wheels are loaded to a greater degree.

FIG. 5C depicts the vehicle where the left front and rear tires are in contact with the low friction patch and where all wheels are loaded equally.

FIG. 5D depicts the vehicle where only the left rear tire is in contact with the low friction patch and where the rear left and the front right wheels are loaded to a greater degree.

FIG. 5E depicts the vehicle where none of the tires are in contact with the low friction patch and where all wheels again are equally loaded.

FIG. 6A illustrates the desired vehicle path.

FIG. 6B illustrates a path that a vehicle may take in a typical skid.

FIG. 6C illustrates how the responses of the active safety suspension system can mitigate the skid.

DETAILED DESCRIPTION

Figure 1:
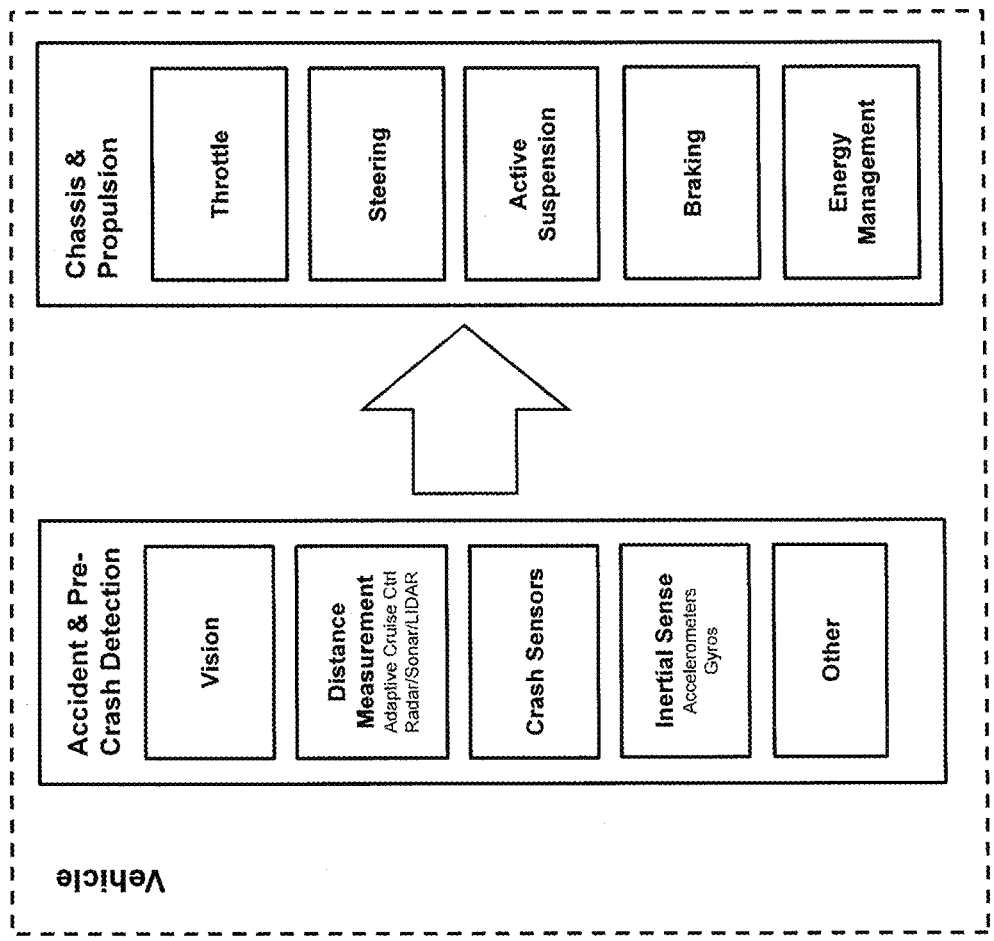
FIG. 1 depicts an integrated system wherein vehicle accident and pre-crash detection systems sense and transmit information to chassis and propulsion systems to improve vehicle handling and safety in pre- and post-crash scenarios.

The present disclosure describes systems and methods to exploit capabilities of a fully active suspension system including fast control, high force, and/or networked capability.

Recently, the inventors have been engaged in an accelerating effort to develop and incorporate active suspension systems in vehicles. During this work the inventors have recognized that the use of properly designed and implemented active suspension systems improve and increase the comfort, enjoyment and safety of vehicles by, for example, mitigating the effect of road surface irregularities and lateral forces induced by traveling along a curved path. However, the inventors have also discovered that an active suspension system may alter the elasto-kinematic behavior of the vehicle and as a result may introduce some undesirable effects in, for example, the steering response of a vehicle. In some embodiments, by properly coordinating the operation of an active suspension system with other systems, such as for example the vehicle's electronic power steering, the undesirable effects of using an active suspension system may be reduced or eliminated. Additionally, in other embodiments, the inventors have also discovered that active suspension systems, acting independently or in concert with other systems, such as for example anti-lock braking or electronic stability control, may improve the road holding ability of a vehicle.

In some embodiments a high-bandwidth active suspension system is used that is capable of both resisting motion of the suspension system connected components in a controlled manner and actively pushing and/or pulling such components. Such operation shall be considered in this disclosure to be indicative of operation in at least three of four suspension force/velocity quadrants of a actuator. In particular, the systems and methods disclosed herein describe an active safety system that controls a fully active suspension in order to yield an active safety suspension system.

Previously developed suspension systems, such as the system described in U.S. Pat. No. 7,206,678, may change ride height in response to a sensed impending collision to provide improved impact geometry. Some anti-lock braking systems also attempt to control wheel traction by regulating the rotational/braking characteristics of the wheel, but they are not capable of effectively varying the applied wheel force. Therefore, the inventors have recognized that in some embodiments, it may be desirable for an active suspension system to effectively manage wheel force in coordination with the actions of other systems during the pre-crash period (the time between the pre-collision detection and the collision event). For example, the active suspension system may employ a particular lift command to maintain an altered ride height as well as to control wheel force. Active wheel force control during the pre-crash period may be especially important in order to reduce stopping distance and to improve handling and braking characteristics of the vehicle, both of which may aid in avoiding a collision and may reduce the severity of the collision if it were to occur.

The disclosed active safety suspension system is able to actively control wheel force in at least three suspension quadrants to maintain optimal contact with the road while implementing ride height adjustments. Additionally, by for example exploiting high bandwidth active suspension capability, ride height adjustment, and suspension characteristics, wheel force can be made safely and accurately optimized even when time-to-impact is short. The disclosed active safety suspension system is also able to continue to at least partially operate even in failure modes where one or more active suspension actuators are destroyed (such as during a crash); to dynamically control vehicle position even after the initial collision contact and throughout the deceleration event; and to detect objects the vehicle will collide with, classify them (e.g. vehicle with a particular bumper height, a pedestrian of a certain height, etc.), and calculate an optimal ride height based on the object classification, calculated parameters and predetermined criteria.

In order to effectively control wheel force in the vertical direction (normal to the tire contact surface with the road), an active suspension may require a rapid response time and the ability to produce dynamic responses to an input. Depending on the embodiment, the response time may be less than 50 milliseconds, less than 25 milliseconds or less than 10 milliseconds to a command for a step change in applied vertical force (to the vehicle body), where the response time is defined as the delay between a command for a step change and reaching 90% of the steady state commanded output. Embodiments disclosed herein provide such capability. In addition, the present active safety suspension system is able to exploit the multiple degrees of freedom on a vehicle by using multiple actuators in a coordinated fashion. These active suspension system responses can be vectored normal to the road to produce instantaneous or short duration (approximately half the period of the natural frequency of the vehicle body) changes in wheel force tailored and timed precisely to the particular vehicle state parameter information the suspension system determines or receives from other subsystems (e.g. ABS or ESP controllers). This capability gives the active safety suspension system enhanced wheel control because it allows the system to have control over wheel force variation as well as some aspects of the total tire force. More control over the tire/road interaction is desirable in many situations, including when tires are skidding and when the vehicle is attempting to make a turn.

While previously developed suspension systems provide limited communication between the suspension system and central vehicle electronic control units (ECUs), this is typically limited to sensed vehicle sensor information. In addition, this information flows only in one direction from, for example a vehicle ECU or sensor to the suspension system.

In some embodiments, an active safety suspension system is capable of real-time bi-directional communication with one or more DAS systems. This communication may be through any appropriate connection including, for example, a controller area network (CAN), a local interconnect network (LIN), a vehicle area network (VAN), FlexRay, D2B, a direct communication link (such as wires and optical fibers), or a wireless communication link. For example, the active safety suspension system may sense and send information to other such systems, like ABS or ESC, while receiving vehicle state parameters or other information from these same systems, such as for example, vehicle yaw and yaw rate, vehicle velocity, vehicle acceleration, vehicle lateral acceleration, steering wheel position, steering wheel torque, if the brakes are being applied, and suspension spring compression. In particular, the active suspension system may respond and/or adapt not only based on information from the vehicle ECU, but also based on the state of vehicle subsystems, such as ABS and ESP, that engage during unusual events. For example, the system may provide different control of the wheels and vehicle if such a system is engaged (e.g. it may provide force vectoring as described herein).

In addition to the above, in some embodiments an active suspension system may sense several parameters relating to the road, wheel, vehicle body movement, and other parameters that may benefit other vehicle DAS sub-systems. Such information may be transmitted from the active suspension system controllers to the other such sub-systems. Other vehicle DAS sub-systems may alter their control based on information from the active suspension system. As such, bidirectional information is communicated between the active safety suspension system and other sub-systems, and control of both the active safety suspension system and the other vehicle systems is provided based at least partially on this information transfer. For example, the application of the brakes by the ABS may be synchronized with increase of wheel force by the active suspension system for one or more wheels. Furthermore, if the active safety suspension system detects a potential accident, it may place itself into a pre-crash mode decreasing risks of injury to, for example, both vehicle passengers and pedestrians upon impact.

According to one aspect, the active safety suspension system may respond to information provided by other DAS sub-systems, and may also provide valuable information to them as well. Based at least partially on this information exchange, the DAS sub-systems and/or the active suspension system may alter their behavior. This bi-directional communication may for example, allow the coordination of the active safety suspension response with the responses of other DAS sub-systems to achieve improved vehicle control and safety. According to one aspect, the active safety suspension communicates road condition data to other vehicle systems, which in turn affect, for example, optimal ABS and ESP (also called ESC or DSC) function. For example, during an ABS braking event, it is useful for the ABS to know if the wheel in question is bouncing and thus periodically, at least partially losing traction. Such a state would degrade braking performance and may confuse the anti-lock braking algorithms. An embodiment of the disclosed active safety suspension system detects vertical wheel bounce and provides data to the ABS, which would enable the ABS to create tailored braking control for each wheel of the vehicle and also properly time the application of brakes. Such data may be a simple signal indicating that the wheel is bouncing, or comprise a more complex signal including, for example, time, frequency, amplitude, and other kinematic information defining the wheel movement. The active suspension system may also be configured to act in a coordinated manner with other DAS sub-systems, such as, for example, an ABS, such that the effectiveness of each is enhanced. For example, the active suspension system may increase the vertical contact force between the wheel and the road at a particular time relative to the ABS cycle of a particular wheel.

According to another aspect, active suspension system responses can be vectored to produce wheel force or wheel force variation that is tailored to improve wheel traction characteristics. This system may be beneficially coupled with traditional traction control systems that operate in the rotational direction through brake or rotational torque control. An active suspension system may also be used to apply a twist force on a vehicle body. A twist force would entail the implementation of simultaneous pull up and push down commands for various wheels, exploiting the inertia of the vehicle body to create a transient increase of the vertical wheel-to-road contact force on certain wheels and a countervailing decrease on others. In certain embodiments when applying a twist force on a vehicle, the increases and decreases would cancel and there would be no net change in the force on the vehicle body. For example, a twist force may be applied when a tire blowout occurs. In such an occurrence, the active suspension system may vector suspension system response at each wheel to, for example, reduce the force applied by a blown out tire and the tire in the opposite corner from it but would still support the vehicle by increasing the force on the other two tires.

According to another aspect, if the active suspension system detects or is informed that a collision may be imminent, it may pre-emptively put itself into a crash mitigation mode that will dynamically adapt both chassis position and wheel control to provide the lowest risk of injury to the vehicle passengers and maximum tire traction. According to another aspect, if the impending crash were with a pedestrian, the crash mode may determine the orientation of the vehicle least likely to cause major injury to the pedestrian. This crash mode can rapidly or progressively raise or lower the body of the car to achieve a desired optimal impact-ready orientation before the impact occurs, and manage wheel dynamics for maximal road contact at least throughout the pre-crash period.

According to another aspect, the active safety suspension system maintains maximum road contact during at least a portion of a detected pre-crash period. According to an aspect, the active suspension system further controls chassis position, even if some elements of the systems are damaged, by using actuators that are still operable. The active safety suspension system may manage ride height and wheel dynamics even without all of the actuators being operational.

According to one aspect, the active suspension system detects objects such as a vehicle in the collision path, and classifies them. Such classifications may comprise an object-type detection, such as differentiating between a vehicle, stationary object, and pedestrian. Furthermore, the object classification system may calculate one or more parameters of the object that the vehicle is prone to collide with, such as a pedestrian's height, a vehicle's bumper position (vertical height), and the contour of a stationary object. Furthermore, an algorithm may be used to correlate the classified object and an optimal impact location for the vehicle's bumper or other physical reference point.

According to another aspect, the active suspension system can comprise networked individual suspension systems with integrated controllers disposed at each wheel of the vehicle.

According to another aspect, one or more centralized controllers remotely control actuators at each corner and receive sensor data. Each of these individual wheel specific suspension systems may employ one or more sensors to detect wheel movement and/or positioning. Data from either the centralized active suspension controllers or distributed controllers may be shared with other vehicle ECUs or DAS sub-systems such as, for example, ABS and ESC. Distributed controllers allow more rapid communication between the controller and the actuator. Likewise, vehicle active safety suspension system data may also be shared with systems such as, for example, ESP, ABS, and airbag deployment system ECUs via a communication network on the vehicle. In one embodiment, the individual suspension units manage their own wheel control while executing a vehicle-wide safety protocol in response to vehicle safety condition data.

According to another aspect, a distributed active suspension system may be able to at least partially continue operation even after an initial collision impact. In such an embodiment, the active suspension system may include a plurality of self-contained hydraulic actuators, each comprising a self-contained hydraulic circuit and an actuator-specific control unit. In the event of a frontal collision, for example, destruction of the two front actuators, the rear actuators may be at least partially operational (e.g. the entire system does not lose hydraulic pressure due, for example, to a single leak).

In some embodiments, an anti-lock braking event may comprise a scenario where one or more vehicle electronic control units detect a wheel slippage event during braking and pulse brake application at the wheels to improve braking performance. A stability control event may comprise a scenario where one or more vehicle electronic control units detect a wheel slippage event and vehicle kinematics that differ from the expected kinematics (e.g. slippage during a turn, unexpected yaw, etc.) and at least one of brake application and torque vectoring (changing rotational power delivered to each wheel) are controlled.

Turning now to the figures, several non-limiting embodiments are described in more detail. However, it should be understood that the components and features described below may be used individually or in any appropriate combination as the disclosure is not so limited.

FIG. 1 depicts a system wherein vehicle accident and pre-crash detection systems sense and transmit information to, for example, chassis and propulsion systems to increase coordination in vehicle handling and safety activity in pre-crash scenarios. Accident and pre-crash detection systems may include vision sensors (e.g. stereo vision cameras), crash sensors (e.g. accelerometers), distance measurement systems such as, for example, adaptive cruise control radar, sonar, or LiDAR, inertial sensors such as, for example, accelerometers, gyroscopes, and IMUs, and any other suitable sensor systems. A controller may detect an imminent collision using a variety of metrics. For example, a sensor may detect an object such as another vehicle, a pedestrian, or a stationary object and determine its spatial relationship with respect to the vehicle (e.g. a distance measurement using stereo vision techniques or using a radar sensor). A controller may then determine that there is a likelihood of collision between the object and the vehicle by predicting the kinematics of the vehicle and the object based on measurements and analysis. An avoidance measure threshold may then be used to determine if the vehicle may avoid the object. For example, the avoidance measure threshold may account for the braking performance of the vehicle and its weight and speed to determine if a collision with the object can be avoided. Since such avoidance maneuvers and control inputs often involve human factors, a statistical probability model or historical empirical model may be used to determine if it is reasonable that the collision can or will be avoided given the estimated time to impact with the object and vehicle control limitations (e.g. maximum deceleration and human response time along with some safety factors) such that the system should execute these avoidance maneuvers.

In the embodiment of FIG. 1, at least one of the chassis and propulsion systems is controlled in response to such accident and pre-crash detection sensor data. Such controlled systems may include throttle, steering, active suspension, braking, and energy management systems. Control of such systems may include commanding a ride height or vehicle orientation (in some instances the vehicle may be oriented such that the plane of the vehicle is not parallel with the road surface) after an impending accident is detected such that the ride height/stance is optimized to reduce the likelihood and/or severity of injury to vehicle occupants as a result of the collision. In another embodiment, control of such systems includes commanding a coordinated control of a plurality of actuators and/or systems. For example, an active safety system may engage an automated collision avoidance braking system, thus engaging the brakes even without driver input, while also affecting a change in the electronic suspension system of the vehicle. In an alternate automated active safety embodiment, the accident and pre-crash detection sensors may detect an impending collision, determine an optimal vehicle chassis and propulsion response, and utilize one or more chassis and propulsion actuators to implement the response. For example, a stereo-vision and radar distance measurement system may both detect an impending collision with a vehicle stopping ahead. For example, an optimal magnitude and/or timing of braking force and/or steering input may be implemented to avoid the collision, and active suspension strategy may simultaneously be calculated and then executed.

Figure 2:
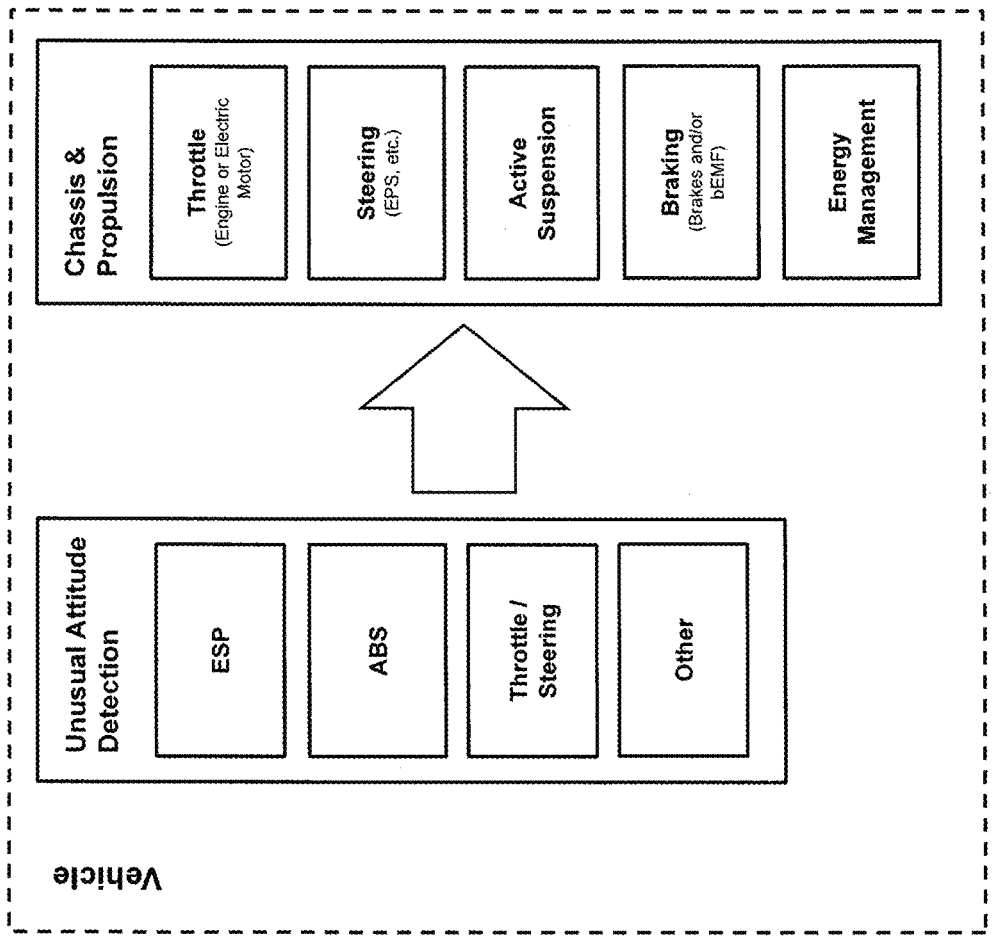
FIG. 2 depicts an integrated system wherein vehicle systems detect unusual vehicle attitudes and transmit that information to chassis and propulsion systems to improve vehicle handling and safety during unusual vehicle attitudes.

FIG. 2 depicts a system wherein vehicle systems detect unusual vehicle attitudes and transmit that information to chassis and propulsion systems to improve vehicle handling and safety during unusual vehicle scenarios. Vehicle systems that can detect unusual vehicle attitudes may include the electronic stability control system (ESC), anti-lock braking system (ABS), throttle and steering monitoring systems (where erratic patterns or inputs exceed at least one predetermined threshold), or other systems. In some embodiments, an unusual vehicle attitude may require certain events to occur multiple times within a certain period. In one example, a combination of a hard braking event and a step steering input may comprise an unusual attitude. In some embodiments, an unusual vehicle attitude may comprise a combination of a dynamic state of the vehicle and driver inputs. It may be desirable to control a plurality of chassis and propulsion systems using data from the accident and pre-crash detection systems including throttle, steering, active suspension, braking, and energy management systems. In one embodiment, a detected unusual attitude of the ESC system engaging may command the active suspension to bias control to ensure that maximal wheel traction is enforced. In another embodiment, wheel-specific data may be transmitted from the ESC so that the active suspension can bias wheel traction on a specific wheel or multiple wheels. Such control may occur at high frequency (e.g. over 8 Hz) and in conjunction with dynamic traction and slippage events being detected by the ABS, ESC, or other vehicle systems. In another embodiment, the wheel-specific data may be coordinated with the ABS or ESC brake application such that the active suspension provides wheel force control coordinated with the braking application. In several of the embodiments given above, an energy management system may prepare the vehicle for a high energy event by performing tasks such as charging a battery, supercapacitor, or other energy storage device that operatively supplies one or more chassis systems with electrical energy, discharging any energy storage devices to reduce the stored energy that can be hazardous during a crash, or other energy management functions. While the above descriptions disclose a few embodiments of the active suspension system responding to DAS sub-systems, other response scenarios are possible and the scope of disclosure described herein is not limited in this regard.

FIG. 3A shows an embodiment of an active safety suspension system controlling a vehicle based on a sensed event. Specifically, in this embodiment, the active safety suspension system responds to set a ride stance/height/posture when a likely frontal, side, or rear collision is predicted. FIGS. 3A and 3B focus on a frontal impact example. As depicted in the figure, at least one forward-looking sensor 302 senses and transmits forward-looking information to at least one active safety controller, which interprets this information alongside other vehicle state parameter information. The active safety controller determines that an imminent collision with an object, in this embodiment another vehicle 306, is about to occur. The active safety controller then classifies the object 306 by using a variety of sensor inputs. For example, vision cameras may detect certain features on the object, or the radar may detect a particular movement or shape characteristic of the object, which may be used to classify the object. Many object classification systems are known in the art, and the use of such object classification systems is not limited to any one system or to only systems known in the art. In this case, the active safety system classifies the object as a vehicle. It some embodiments, the active safety suspension system may also detect at least one parameter of a vehicle, such as, for example, a bumper position, vehicle shape, orientation, and/or vehicle model. Given the object classification and the object parameters, the active safety controller then calculates an optimal impact posture.

Depending on the embodiment, an optimal impact stance may correspond to a simple ride height adjustment to, for example, align the bumper of the vehicle 308 with the other vehicle 306. In a more complex scenario, the vehicle may set a front and rear ride height, or a left and right ride height, which are different from one another, in order to create a safer impact event. The posture determines an optimal height/position for each actuator 304. One or more active safety controllers then send a signal to the active suspension system (or in a distributed scenario to each actuator) to change the position of at least one of the plurality of active suspension actuators to change the ride stance/height of the vehicle, in this case lifting the vehicle 308 to create bumper-to-bumper contact, a safer vehicle orientation able to absorb energy resulting from the collision. In FIG. 3B, the vehicle is seen with increased ride height in order to provide the safer collision stance. In another case, the object detected may be classified as a pedestrian from the object classification system, and the object parameters may include pedestrian height and torso position. In this case, the vehicle may lift to minimize the lash moment on the individual in the event of a collision.

Figure 3C:
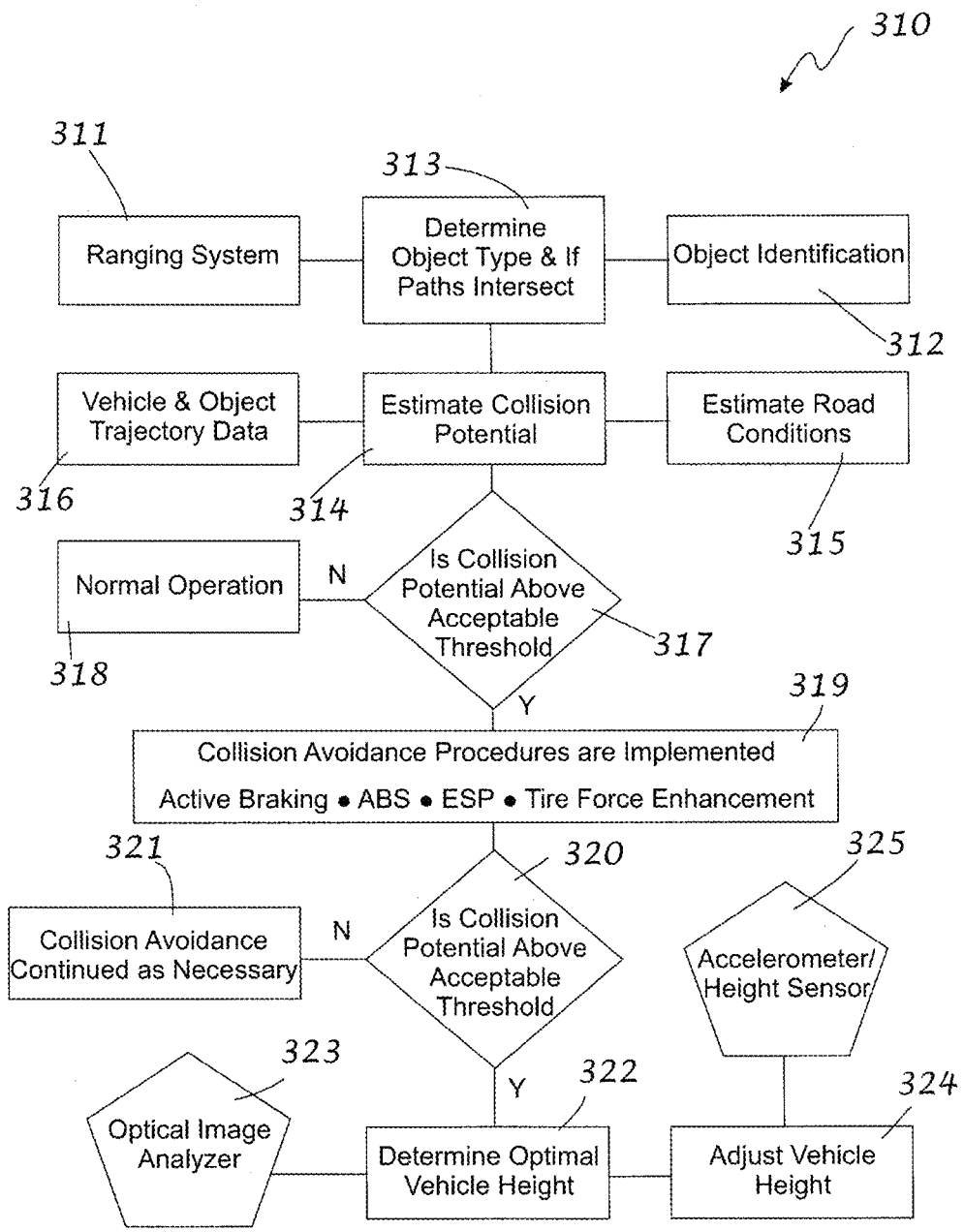
FIG. 3C depicts a flow chart of an example of an algorithm for detecting and reacting to a potential collision using an active safety suspension system.

FIG. 3C depicts a flow chart of an example of an algorithm 310 for detecting a potential collision between a vehicle and another object and taking steps to avoid the collision or ameliorate its effect. Ranging System 311 and Object Identification System 312 collect information for use by the vehicle. An operation 313 is performed to identify the object and determine if the object is or will be in the vehicle's path at a certain point in time. At operation 314 the potential for collision is based on road conditions determined at operation 315 and the expected point of collision based on the trajectory of the vehicle and the object determined at operation 316. At box 317 the likelihood of collision is determined based, for example, statistical, empirical or mathematical models. If the likelihood of collision is below a threshold value, the vehicle is allowed to operate normally at box 318. If the likelihood of an accident is above a threshold value, collision avoidance procedures are implemented at box 319. These procedures may involve the use of various systems, such as for example, the use of active braking, ABS, ESP and tire force enhancement using active suspension actuators. These systems may be used independently or in coordination with one another. At box 320 a further decision may be made based on the level of collision avoidance that is achieved. If it is determined that collision is likely not to occur, collision avoidance measures may be terminated and the vehicle is returned to normal operation. On the other hand, if it is determined that the vehicle is still likely to collide with the object, the optimal height and/or vehicle planar orientation for the crash is determined at box 322 based on data from, for example, an optical image analyzer 323. The active suspension actuators are used to adjust the height of the vehicle at box 324 based on height information from sensors 325, which may include, for example, a height sensor, a ranging system or an inertial system that may comprise an accelerometer. Alternatively, in some embodiments, the step in box 320 and/or the step in box 319 may be bypassed and the operation in box 322 implemented instead.

FIGS. 4A to 4E depict an embodiment of an active safety suspension system's inertial force impulse response to the vehicle turning while crossing over a low friction ($\mu$) surface. The figures depict one embodiment of an active safety suspension system that improves wheel traction during a slippage event by providing inertial force impulsing. This example demonstrates an illustrative response when a vehicle is turning and a wheel travels over a low friction surface (referred to herein as a low $\mu$ surface, $\mu$ representing a coefficient of friction), such as for example, a patch of ice 402. The relative area of the circle at each corner of the vehicle 404 represents the relative magnitude of the normal force (vertical force between the road and vehicle) exerted by the suspension actuator at the corresponding wheel. A larger circle corresponds to a larger force.

In this example, the vehicle is turning left, thus creating a net centrifugal force on the vehicle. This centrifugal force is counter-balanced by lateral traction forces 403 at each wheel due to lateral hold/slip of the tire contact patch with respect to the road. As a wheel travels over the low $\mu$ surface, the wheel experiences a decrease in lateral holding force due to the decreased coefficient of friction as compared to the rest of the road. The tire may begin to slip and cause the vehicle to skid or fishtail and diverge from its intended path. Fishtailing and skidding can be dangerous because vehicle operators have less control of the vehicle and often over-correct when they feel vehicle slippage. Extreme cases of fishtailing or skidding can cause the vehicle to enter a spin, in which the driver has even less control. This slippage can be detected using a variety of methods. For example, IMU (Inertial Measurement Unit), accelerometers, and/or gyroscopes, can be used to determine the actual travel path of the vehicle. The divergence of the vehicle from the intended path can be determined by comparing the actual path with the path commanded by the steering system. In addition, wheel sensors can detect wheel slippage by comparing the angular velocity of the wheel to other wheels, to the expected linear velocity as determined by inertial sensors or GPS systems. Many of these calculations may already be available from other active safety systems on the vehicle such as ESP or ABS, and may be provided to the active suspension system (such as digitally over a digital CAN bus network).

With a slippage event occurring and properly detected, the active safety suspension system can temporarily create more lateral force on the slipping wheel 406 to improve traction by rapidly stomping or pushing down on the vehicle's front axle, increasing the normal (vertical) force on the wheel. The augmented vertical force is represented by the larger area circle at two of the wheels. Regulating this increased normal force from the actuator 408 on the wheel 406 helps to increase the lateral force by increasing the tire's traction and mitigating the vehicle's sliding. This increase in normal force is temporary and is ultimately countered by acceleration of the vehicle body, and thus may not be maintained for an extended time. Instead, the increase in normal tire force is timed such that it provides increased traction during a short period of time when increased traction is required, and then decreases traction a short period afterward in such a way that the vehicle's unintended in-plane motions (yaw and lateral) are less startling to the occupants than in absence of this intervention.

The same principle can be applied to the rear axle if one of the rear tires is slipping as shown in FIG. 4D or could be applied to the wheels either side of the vehicle if necessary. This extra traction allows the vehicle to make its turn with reduced skidding, allowing for a more predictable path of travel and easier vehicle handling.

FIGS. 5A to 5E depict one embodiment of an active safety suspension system's twist force vectoring applied such that the vehicle maintains a more predictable path of travel when the vehicle is attempting to make a right turn while moving across a patch of ice 502 or other low μ surface. Again, the area of the circle 504 at each corner of the vehicle represents the magnitude of the normal force exerted by the suspension actuator on the corresponding wheel, with the larger area corresponding to a larger normal force. As the wheel crosses the patch of ice, the wheel experiences a decrease in lateral force due to the lower coefficient of friction of the ice as compared to the rest of the road. The sudden decrease in lateral force may cause the vehicle to skid or fishtail out of its intended turning path.

The active safety suspension system can preferentially apply more force to the slipping wheel 506 and the diagonally opposed wheel 506a using the active safety suspension system's twist force vectoring response to create a twist or a warp on the vehicle chassis. In some embodiments constant total vertical force on the vehicle may be maintained, while some normal force is shifted from one pair of tires to a second pair. Additional normal force may be applied to two of the wheels at opposite corners of the vehicle, while normal force at the remaining two corners is reduced. If the overall force on the vehicle can be held constant, by balancing the increase in the amount of force applied at one pair of wheels with a decrease in the force applied to the second pair, the twist force response can be implemented and maintained as long as necessary to provide a desired normal force at wheel 506. This twist force vectoring response can be rapidly switched between different wheels in order to deliver increased normal force and counteract skidding as shown in FIG. 5D. This increased traction from the additional normal force allows the vehicle to make its turn with minimal skidding, providing a more predictable path of travel and easier vehicle handling.

A braking demand event is a period during which a driver and/or a vehicle system requests vehicle deceleration. Wheel force is the net force applied by the wheel on the road surface. Wheel traction force is the component of wheel force that is aligned with a direction of travel of the center of mass of the vehicle. The vertical component of the wheel force is the component of the wheel force that is normal to the portion of the road surface in contact with the wheel. Pulsing of the brakes at a wheel means applying the brakes at a wheel, either partially or fully, at a constant or variable frequency during the braking demand event. Pulsing of the wheel force means using an active suspension system to apply a varying force on a wheel at a constant or variable frequency. The pulsing of the brakes and the pulsing of the wheel force may occur simultaneously during a braking demand event. The pulsing of the brakes and/or the wheel force may occur at the same frequency or at different frequencies, at constant frequencies or variable frequencies, and in phase with each other, or with a phase lag or a phase lead. In some embodiments the phase lag or lead may be between 0 degrees and 30 degrees. A steering adjustment system is a system that affects the reaction torques felt by the driver during the operation of the vehicle and and/or the relationship between the angular rotation of the steering wheel and the road wheel steering angle. Slaloming of the vehicle is the side-to-side lateral movement of the vehicle. The dead-band of a steering wheel is a region of insensitivity where the rotation of the steering wheel produces a less pronounced change in the road wheel steering angle. A road monitoring device may be, for example, a camera or other sensor that identifies possible objects in the actual or anticipated path of the vehicle.

FIGS. 6A to 6C depict an embodiment of the functionality of the twist force vectoring response or inertial force impulsing response when a vehicle begins skidding when navigating a curved path. Specifically, FIG. 6A shows the desired vehicle path 602 and chassis orientation that the vehicle would take in the absence of any skidding. FIG. 6B shows a path 604 that a vehicle may take in a typical skid, where the skid begins as the front of the vehicle starts to slide and the driver overcorrects. Either of these two events could send the vehicle into a spin, which would be very dangerous for the driver and other vehicle passengers. This path is not predictable, and the situation requires a skilled driver to return the car to its correct turning path. FIG. 6C shows an embodiment of how the responses of the active safety suspension system can mitigate skids by tracking the vehicle and chassis orientation into a wider turn 606. The active safety suspension system can put a twist force on the chassis or selectively increase the vertical force on one vehicle axle in response to a skid. Both of these responses apply more normal force on the slipping wheel, increasing the wheel's lateral force tolerance, reducing the amount of skidding and achieving a path that more closely approximates the desired path. Allowing the vehicle to take a more stable, yet wider turning path reduces the risk of the vehicle entering a spin and eliminates the need for a skilled driver to correct for any divergence from the desired path.

Figure 6D:
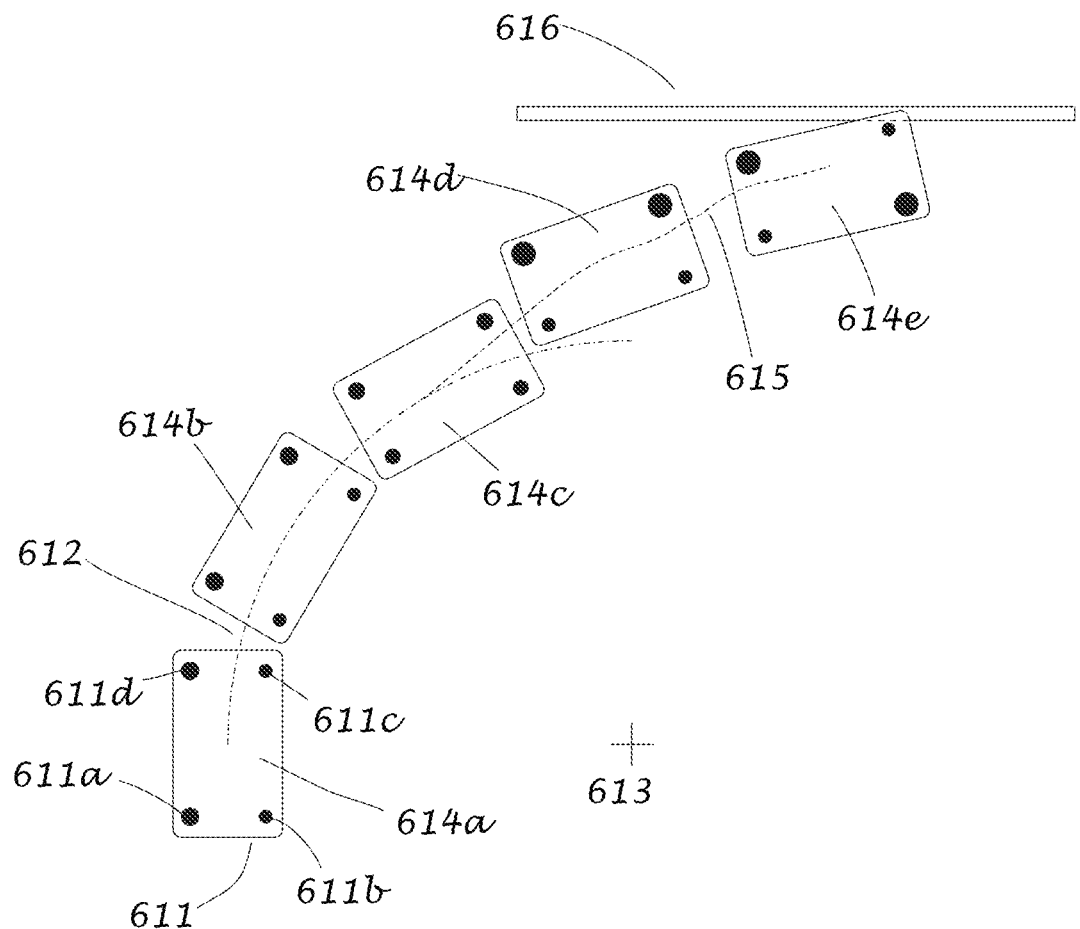
FIG. 6D illustrates the use of an active suspension system to mitigate the possibility of a trip induced rollover.

FIG. 6D depicts a vehicle 611 traveling, at constant speed, along a circular path 612 with a center of rotation 613. When the vehicle is in position 614a or position 614b, the left front (LF) tire and left rear (LR) tire (i.e. the outside tires) are more heavily loaded (in the vertical direction) than the right front (RF) tire and the right rear (RR) tire (i.e. the inside tires) due to the moment of the lateral force (centrifugal force) that acts at the center of gravity (not shown) of the vehicle as it accelerates along the circular path 612. The relative size of dots 611a, 611b, 611c and 611d indicate the relative loading (i.e. the vertical force applied by the road surface on each wheel (i.e. the larger the diameter of the dot the larger the magnitude of the force). The vertical force applied by the ground is the reaction to the vertical component of the wheel-force at each wheel.

When the vehicle is in position 614c, it has started to skid and departed from circular path 612 and started to travel along path 615 towards curb 616. In such a situation, the loading on the tires would typically equilibrate because the vehicle is no longer accelerating along a curved path. In position 614d, ranging systems may be used to detect the curb 616 which may act as a trip and induce a rollover when, for example, the LF tire strikes it. Appropriate ranging systems may include, for example and without limitation, one or more of: an acoustic ranging sensor, a LiDAR sensor, a radar ranging device and a camera. In instances where a trip hazard has been detected, it may be desirable to mitigate the possibility of a roll over. In one such embodiment, at position 614d, the active suspension system may be used to apply a moment that induces angular acceleration in a direction opposite to the anticipated rollover direction that could occur as a result of striking the trip represented by curb 616. Such a moment may, for example, be induced by extending the actuators on the side of the vehicle closest to the trip and/or compressing the actuators that are on the opposite side of the vehicle. In some embodiments the extension and compression may be implemented at the maximum rate that the actuators are capable of. In some embodiments, the moment may be timed such that the angular momentum is at approximately a maximum value, e.g. in this example when the LF tire reaches the curb 616. Additionally or alternatively, the active suspension system may be used to accelerate the LF tire in the upward direction so that it can more readily jump the curb 616 reducing the possibility of a rollover.

In addition to the above, active suspension systems may also be used to prevent rollovers even in the absence of a trip. For example, rollover may occur when a vehicle is navigating a turn at a high rate of speed. In such a situation the sidewall of one or more tires, on the outside of the vehicle, may collapse and allow a wheel rim to hit the road surface. This is more likely to occur if the suspension of one or more outside wheels bottoms out at a high rate of speed. In such a situation one or more tires may become overloaded. The active suspension system may be used to limit the rate at which the suspension of outside wheels can bottom out, for example, in a high speed turn. This action may be taken based on information exchanged between the active suspension system and, for example, a central vehicle ECU and/or other DAS systems.

Figure 7A:
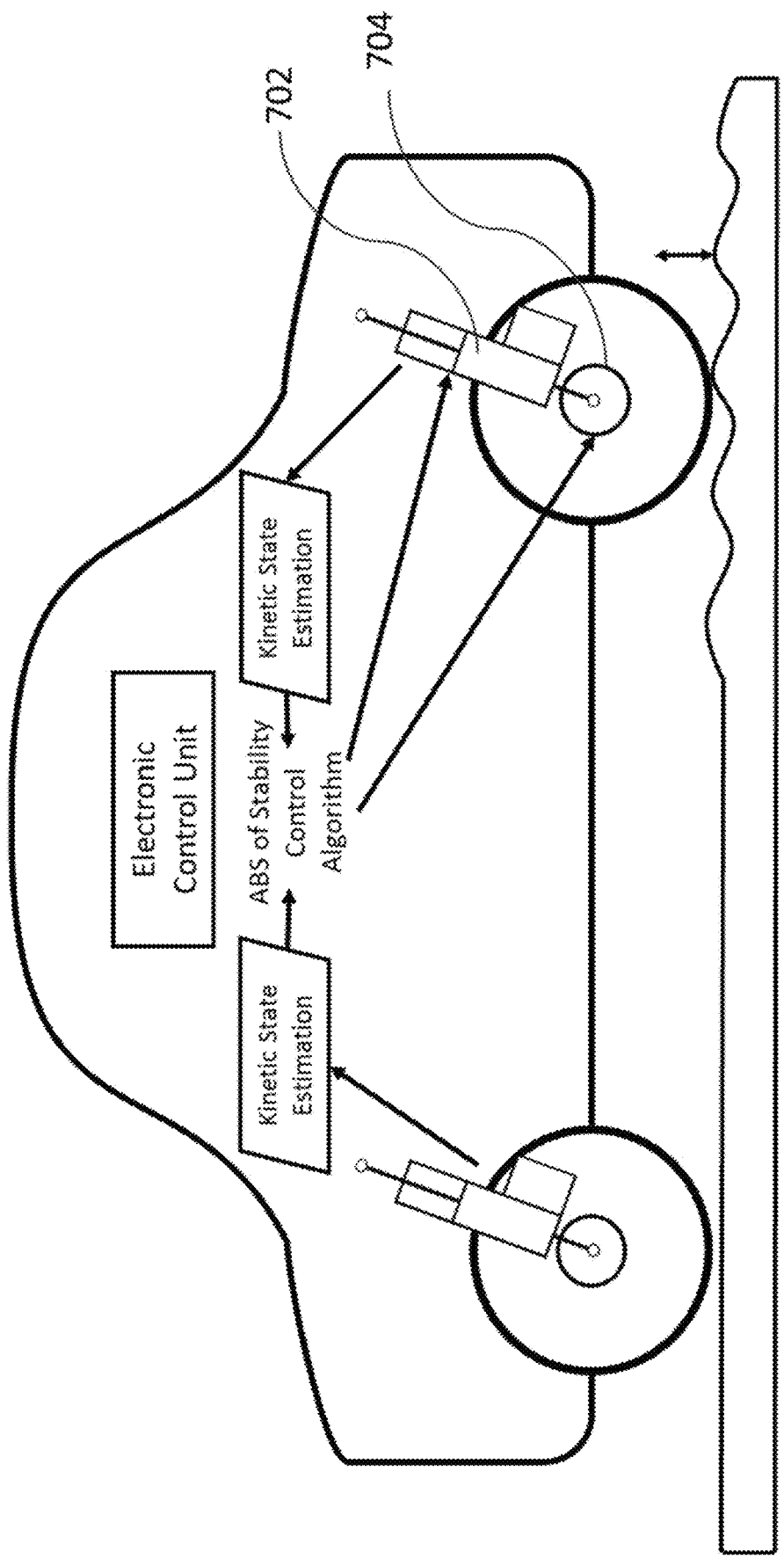
FIG. 7A depicts an active safety suspension system that has bidirectional communication with ABS and/or ESP systems, wherein the suspension transmits information to ABS/ESP, and ABS/ESP transmits information to the suspension system such that the active suspension alters control in response to this information.

FIG. 7A depicts one embodiment of the active safety suspension system's bi-directional communication capabilities. The active suspension system 702 may estimate a kinematic state in the axial direction of suspension travel and send that information to an electronic control unit on the vehicle responsible for, for example, the anti-lock braking or the stability control. The kinematic state of the suspension may comprise an array of sensed or calculated values such as, for example and without limitation, suspension or wheel velocity, acceleration, position, power consumption/regeneration, body acceleration, wheel acceleration, temperature, or wheel hop frequencies. The electronic control unit's algorithm may use the kinematic state information to compute commands to the vehicle's anti-lock braking 704 or the active safety suspension system 702 and impart control on both systems. In such an embodiment, when the active suspension system relays sensed or processed information to the ABS or ESP controller, the ABS or ESP controller may modify its brake application control at least partially based on such data, and then it may relay information back to the active suspension system that the active suspension can use. The information that is relayed back may include, for example, the timing of brake application and the vehicle acceleration in any of three axes.

In some embodiments, based on information transmitted from the suspension system, the ESP or ABS subsystems on the vehicle may perform a variety of tasks. They may regulate brake application in sync with vertical wheel motion (e.g. limit brake application if the wheel is leaving the ground). They may further regulate brake application or torque vectoring at the wheels as a function of a measure of road roughness, as calculated by the active suspension system. In some embodiments, they may modify the state estimator within the ESP/ABS algorithms in order to account for active suspension control input. For example, the slippage detection algorithm may ignore wheel data during certain periods when the active suspension is performing particular tasks such as lifting or offloading the wheel.

In some embodiments, based on information from the ESP or ABS subsystems, the active suspension may perform a variety of tasks and control functions. In the event that the ABS has engaged, the active suspension system may, for example, increase wheel-damping gains to improve ABS effectiveness. In another embodiment, the active suspension may execute control algorithms such as the traction enhancing algorithms described elsewhere in this disclosure based on a road friction ($\mu$) estimate from the ABS or ESP controllers. In another embodiment, the active suspension system may modify the average suspension geometry for improved traction performance as a function of ABS or ESP state or requirements. While the above descriptions discuss ABS and ESP systems, the disclosure is not limited in this regard and any system on the vehicle responsible for vehicle stability, wheel traction, or other vehicle dynamics performance, safety or control activity may be suitably exchanged in place of or augmented to ABS and ESP in these descriptions.

Figure 7B:
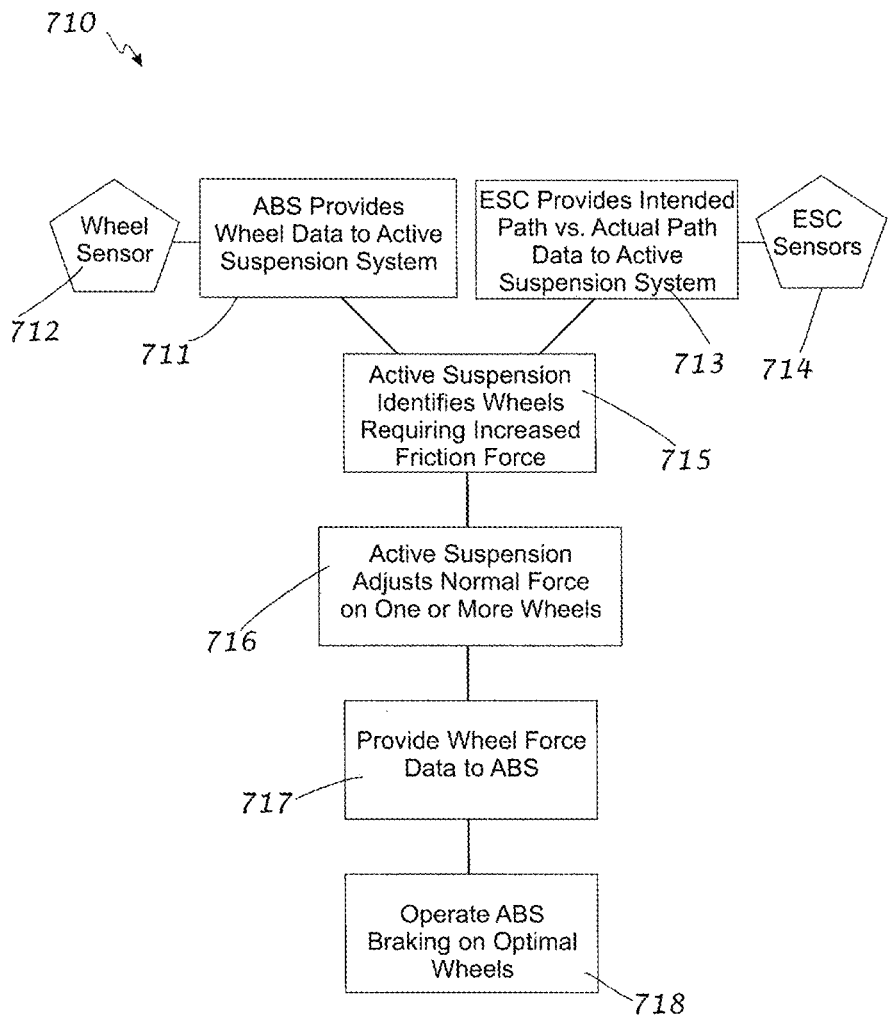
FIG. 7B depicts a flow chart of an algorithm where two-way communication is utilized between an active suspension system and other vehicle systems.

FIG. 7B depicts a flow chart of an embodiment of an algorithm 710 where two-way communication is used between an active suspension system and other vehicle systems, such as a DAS sub-system. In operation 711, the vehicle ABS receives data from, for example, a wheel speed sensor 712, and provides information to the active suspension system. Similarly, at box 713, the ESC system receives information from ESC sensors 714 which may include yaw detectors, linear velocity sensors and steering wheel position detectors and provides information to the active suspension system. Based on this information, at box 715, the active suspension system identifies the wheels that require increased frictional force. This determination may be based on sensor information, such as for example, wheel speed sensors and yaw sensors that determine the extent of wheel slip. At operation 716, the active suspension system adjusts the normal force on one or more wheels. In operation 717, the active suspension system communicates to the ABS which wheels can sustain additional frictional loads and how long that adjustment will last. In some embodiments, the active suspension communicates information about the vertical position of the wheels, the vertical movement of the wheels (for example, velocity, frequency of oscillation, etc.), current torque or force being applied to the wheels, ambient wheel well temperature, road roughness data, or any other sensed or calculated data, such as for example, about the kinematic state of the active suspension system. In operation 718, the ABS uses this information to adjust the braking being applied to each wheel.

Figure 8:
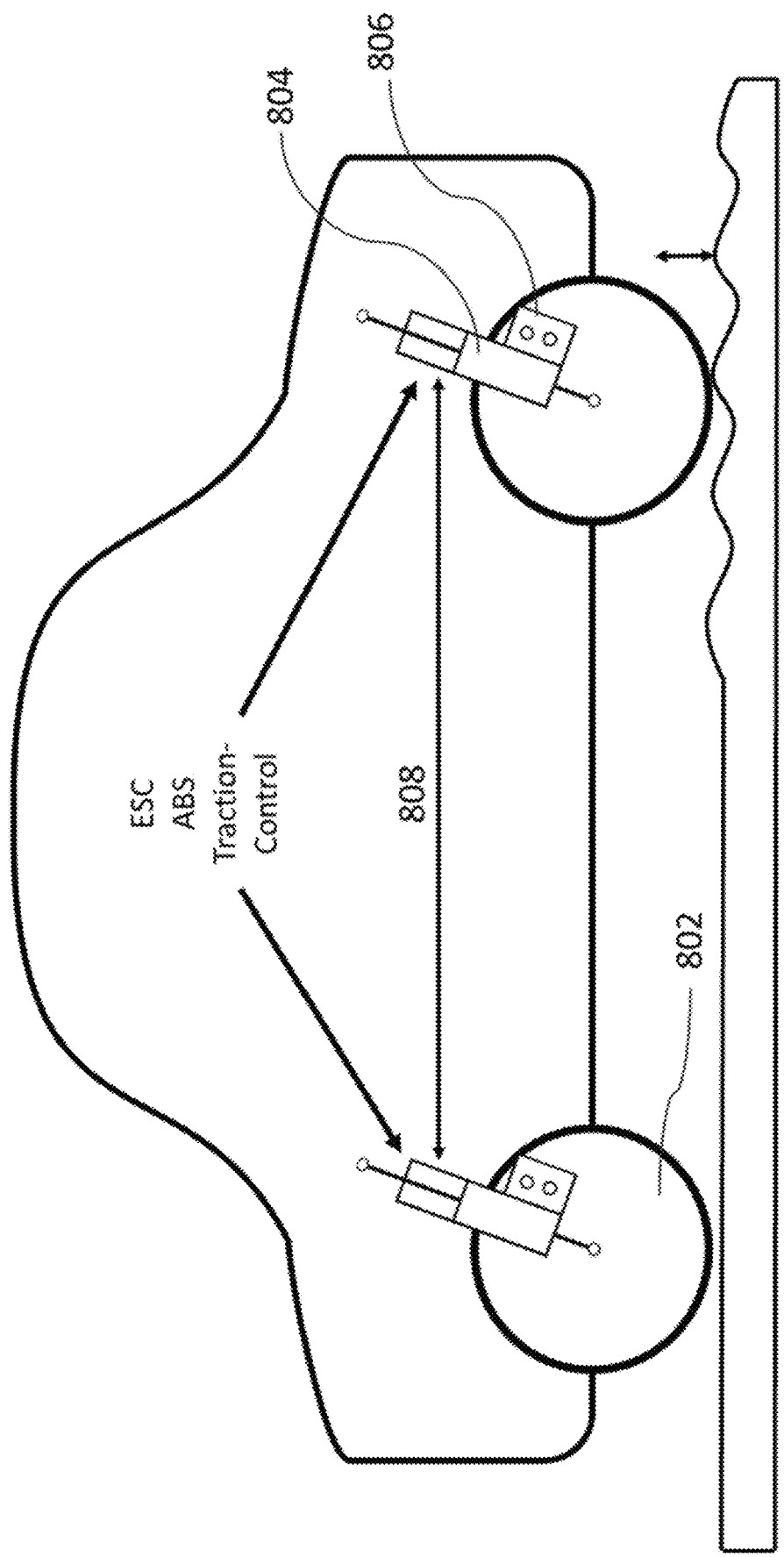
FIG. 8 depicts an embodiment of a method of implementing a network of active safety suspension system actuators that respond to vehicle safety condition violations.

FIG. 8 depicts an embodiment of a method of using networked active safety suspension systems to respond to vehicle safety condition violations. Each wheel 802 of a vehicle is disposed with its own individual active suspension system 804. This individual active suspension system 804 controls the wheel's movement in response to the data it collects from its wheel-specific sensors 806 or that are delivered to it from other sensors. Vehicle safety condition data is shared among other individual active suspension systems across a network 808. This data can be obtained from any of the individual active safety suspension systems or can be supplied by another system that may detect various safety conditions, like electronic stability control, ABS, or traction-control systems. Each individual active safety suspension system 804 may analyze its wheel-specific data and create a wheel-specific suspension protocol to manage its wheel. In addition, the individual active safety suspension system may analyze vehicle safety condition data and works with the other networked active safety suspension systems to create a vehicle-wide safety suspension protocol or strategy to control the vehicle's motion in the presence of one or more vehicle safety condition violations.

Figure 9A:
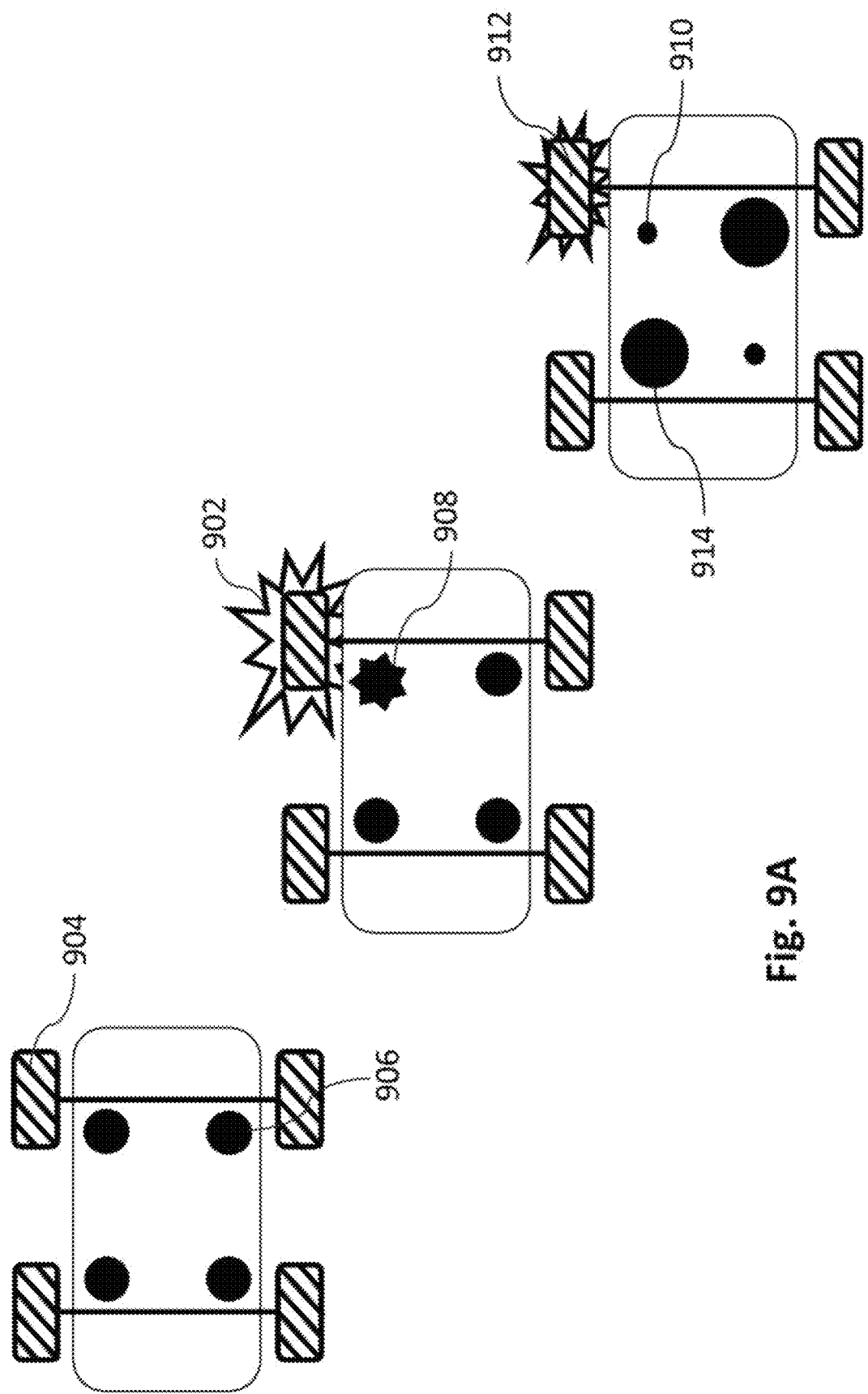
FIG. 9A depicts an embodiment of an active safety suspension system's response to a tire blowout.

The illustration in FIG. 9A shows an example of a response of the active safety suspension system to a tire blowout 902. In this embodiment, the vehicle has an active suspension actuator disposed at each wheel 904 able to control the vertical force load on that particular wheel. This vertical force load is depicted by circles 906 with area proportional to the force on the wheel normal to the road. During a tire blowout 902, the active suspension actuator at the wheel experiencing the blowout 908 senses or receives information from another system about the blowout and responds by rapidly changing the load on the wheel experiencing the blowout and/or other wheels on the vehicle. In this embodiment, the vertical force 908 being applied by the actuator at the blown-out wheel is reduced. This vertical force 910 is reduced by exerting an upward force on the blown-out wheel 912. The active suspension system may compensate for this reduced overall normal force on the vehicle body by exerting an increased force 914 on the wheels on the opposite diagonal. In this situation, an upward force may also be imparted to the wheel in a diagonally opposed position from the wheel undergoing the blow out condition in order to help balance the forces at the two corners.

Figure 9B:
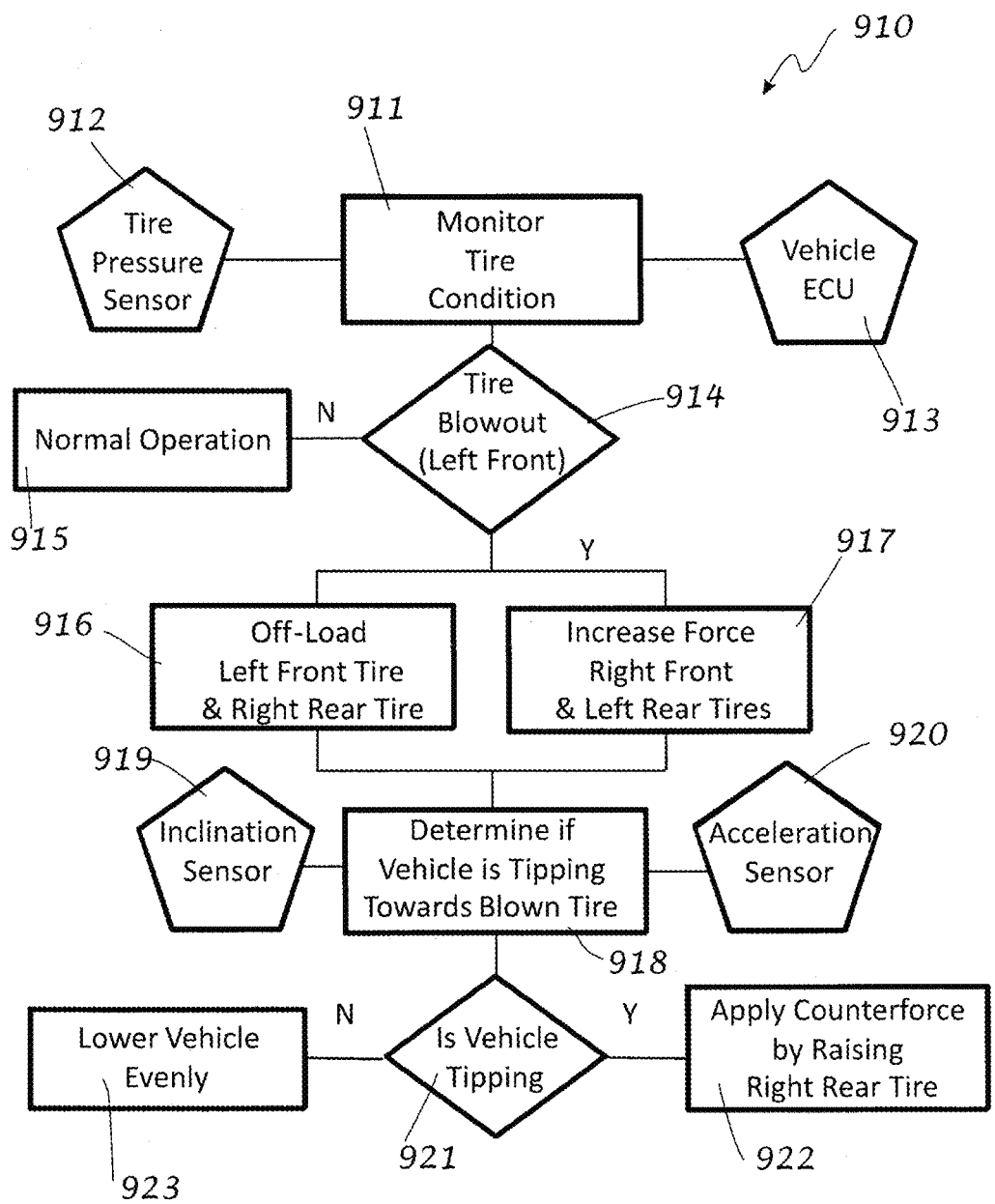
FIG. 9B depicts a flow chart of an example of an algorithm where an active suspension system is used to mitigate the consequences of a tire blowout.

FIG. 9B depicts a flow chart of an example of an algorithm 910 where an active suspension system is used to mitigate the consequences of a tire blowout. At operation 911, tire condition is monitored based on information, for example, from a tire pressure sensor 912 and/or signals provided by a vehicle ECU 913. At box 914, at least the left front tire is tested. If no blowout has occurred, the wheel is allowed to continue normally at box 915. If it is determined that a blowout has occurred at the left front tire, at box 916 the left front (blown) tire and the right rear tires are off loaded. Substantially simultaneously, at box 917, the force on the right front and left rear tires is increased so that the vehicle is substantially supported by these two diagonally located tires. At operation 918, it is determined if the vehicle is tipping towards the blown tire. This may be determined using data from, for example, an inclination sensor 919 and/or an acceleration sensor 920. If it is determined at box 921 that the vehicle is tipping, a counter-acting force may be applied to the vehicle at box 922 by raising the right rear tire at an appropriate rate. If the vehicle is not tipping, the entire vehicle may be lowered evenly at box 923 so that it is closer to the ground and less likely to flip over because of the blown tire.

An active safety suspension system that reacts to improve the safety of the vehicle during unusual vehicle circumstances, may be associated with an adaptive controller for hydraulic power packs. The adaptive controller controls torque or velocity of an electric motor that is operatively coupled to a hydraulic pump. The hydraulic pump provides fluid power to exert a force in the suspension actuator. In one embodiment, when the active safety suspension control system detects an unusual vehicle circumstance (such as an imminent collision, ABS braking engaged, ESP engaged, etc.), one or more adaptive controllers react to change the torque and/or velocity of the electric motor. In the event of an imminent detected collision, for example, adaptive controllers for the front two suspension actuators can increase the motor torque to create a downward force on the two front wheels, lifting the front bumper so it has a more advantageous posture with respect to the vehicle in front of it. Combining an active safety suspension system with an adaptive controller for hydraulic power packs can be advantageous in that motor control can respond quickly to safety critical situations. The adaptive controller may employ a variety of vehicle dynamics algorithms while also taking commands from the active safety system. In addition, in some embodiments the active safety algorithms described in this disclosure can reside in a processor embedded in the adaptive controller.

In some embodiments, an active safety suspension system reacts to improve the safety of a vehicle during unusual vehicle circumstances, and may be associated with a self-driving or autonomous vehicle. In this way, the active safety system may benefit from data and advance knowledge of the navigation/driving algorithms, and sensor data from a variety of sensors, such as, for example, vision, LIDAR, etc. Similarly, the self-driving control system can benefit from sensing and control data in order to change the driving behavior in response to a detected unusual vehicle circumstance. Feedback from the active suspension system may be used to correct or calibrate data received by the vehicle controller. By combining a self-driving vehicle with an active safety suspension system, the overall vehicle safety can be improved. In some embodiments, this may be a result of the active safety suspension utilizing information from self-driving sensors and, thereby, calculating a better estimate of vehicle state. Alternatively or additionally, this enhanced safety may be a result of an active safety suspension requesting the self-driving vehicle to change course.

In one embodiment, a self-driving vehicle's sensors may detect an obstacle and a vehicle velocity that indicate that the vehicle is on a collision course with the obstacle. The self-driving vehicle may relay this information to the active safety system, which can then adjust suspension dynamics to reduce stopping distance and/or reduce the potential effect of an impact on the vehicle occupants by adjusting pre-crash ride height and vehicle posture. In another embodiment, the active safety system may detect an unusual vehicle circumstance and command the vehicle to change, for example, its steering angle, throttle position, etc., in order to mitigate the unusual vehicle circumstance. In another embodiment, the active safety suspension system may utilize information from a vehicle-to-vehicle communication interface, which may transmit data such as, for example, the state or future state of other vehicles in the vicinity, and road and other conditions ahead.

In an embodiment of an active suspension system the suspension system may react to improve the safety of the vehicle during unusual vehicle circumstances. One or more failure-tolerant controllers may be used such that the system may provide some level of actuator control during failure of the primary power or communications bus. In one embodiment, each suspension controller, which is capable of acting autonomously, contains its own battery or capacitor, and/or it is powered from regenerative energy from a recuperative active suspension actuator. In the event that power is lost from the voltage bus, the stored energy or recuperated energy can be used to continue powering the controller, and it can, in turn, control the kinematic characteristic of the actuator. For example, during a vehicle impact, the power to the suspension controllers may be compromised, but the actuators may continue to function by utilizing local energy storage and/or generation. Combining an active safety system with an active suspension controlled by failure-tolerant controllers has the benefit of yielding a safety improvement that is resilient to failures during a vehicle collision or other disruptive event.

In an embodiment of an active suspension system the suspension system may react to improve the safety of the vehicle during unusual vehicle circumstances associated with a predictive energy storage system, where the state of charge of an energy storage system is monitored and regulated in response to anticipated future energy need. In one embodiment, a pre-collision state detected by the active safety suspension system may contain two modes: a first "warning" mode wherein a potential collision is detected, and a second "collision" mode wherein the system determines a collision as imminent and/or unavoidable. These modes are not limited in this regard, however, and may similarly contain modes such as a "danger" mode wherein a driving circumstance is considered high risk (e.g. high speed or high lateral acceleration), and an expected collision mode, wherein a collision is statistically likely but not yet determined. When the first mode is entered, the predictive energy storage system may start to charge the energy storage source in order to be ready for the energy consumption demand (e.g. a DC/DC converter charges a super capacitor or rechargeable battery bank). During the second mode, the predictive energy storage may be used (e.g. the active suspension actuators output high force, consuming energy from the storage system). In some embodiments, there may be more than two modes, and successive modes may indicate larger energy needs in the energy storage system.

Since an active safety suspension system may need a large amount of power delivery at the same time as other devices and systems on the vehicle also need energy (e.g. stability control and ABS braking engaged), an energy storage system may be pre-charged when a safety critical event is anticipated.

In an embodiment of an active suspension system the suspension system may react to improve the safety of the vehicle during unusual vehicle circumstances associated with a vehicular high power electrical system that is independent of the primary vehicle electrical system. In one embodiment, the active safety suspension system may be powered from a loosely regulated DC bus that is at a voltage higher than the primary vehicle electrical system (e.g. it operates at 46V instead of 12V). In some embodiments, a unidirectional or bidirectional DC/DC converter is used to transfer energy from the vehicle electrical system and the vehicular high power electrical system.

Combining an active safety suspension system with a vehicular high power electrical system may be advantageous in that it allows high power delivery to one or more suspension actuators and/or other vehicle electrical devices, such as ABS brakes, electric power steering, etc., in a fashion that can be at least partially decoupled from the primary vehicle electrical system.

In one embodiment the suspension system may react to improve the safety of the vehicle during unusual vehicle circumstances be associated with an integrated smart valve that contains a hydraulic pump, electric motor, and electronic controller. In one embodiment, the active safety suspension system comprises one or more electro-hydraulic smart valves operatively connected to one or more hydraulic rams (actuators). The active safety suspension system may exert a force at each wheel by inducing current in the electric motor, which spins the hydraulic pump, which pumps fluid into the hydraulic ram creating pressure. By dynamically controlling torque in the electric motor, force may be dynamically induced in the actuator. This system may be further combined with electronically controlled valves to perform tasks such as closing fluid flow to create a holding force.

By combining an active safety suspension system with an integrated smart valve and actuator, a low-cost, easy to integrate, and energy efficient active safety suspension system can be implemented. U.S. application Ser. No. 14/212, 359 filed on Mar. 14, 2014; gives further detail about the construction, use and operation of a smart valve and integrated actuator of an active suspension system, and is incorporated herein by reference in its entirety.

In an embodiment an active safety system may react to improve the safety of the vehicle during unusual vehicle circumstances associated with an active chassis power throttling system in which power consumption in ancillary vehicle devices is regulated in conjunction with the active safety system. In one embodiment, during an unusual vehicle circumstance, an active safety controller may send a command to reduce energy consumption in non-critical vehicular devices (such as, for example, a stereo system or heated seats). Further, the controller responsible for commanding the active suspension may respond to the energy needs of other devices on the vehicle such as active roll stabilization, electric power steering, etc., and/or energy availability information such as alternator status, battery voltage, and engine RPM. U.S. application Ser. No. 14/242, 715, which was filed on Apr. 1, 2014, gives further detail about regulating and/or limiting the power consumption of an active suspension system, and is incorporated herein by reference in its entirety.

In one embodiment, an active suspension capable of adjusting its power consumption may reduce its instantaneous and/or time-averaged power consumption if certain events occur, such as for example, vehicle battery voltage drops below a certain threshold; alternator current output is low, engine RPM is low, and battery voltage is dropping at a rate that exceeds a threshold; a controller (e.g. ECU) on the vehicle commands a power consumer device (such as electric power steering) at high power (for example, during a sharp turn at low speed); or an economy mode setting for the active suspension is activated, thus limiting the average power consumption over time Since unusual vehicle circumstances may be taxing on the vehicle's electrical system, with the vehicle seeing peak or near-peak loads during these events, a power throttling system that responds to an unusual vehicle circumstance in order to reduce energy consumption in non-essential devices is desirable. U.S. application Ser. No. 14/212,431, which was filed on Mar. 14, 2014, gives further detail about managing power allocation and consumption in vehicles that may include various high power consumption systems, such as an active suspension system, and is incorporated herein by reference in its entirety.

In one embodiment, an active safety suspension system reacts to improve the safety of the vehicle during unusual vehicle circumstances, where it may receive data from other vehicle control and sensing systems [such as, for example, GPS, self-driving parameters, vehicle mode setting (i.e. comfort/sport/eco), driver behavior (e.g. how aggressive is the throttle and steering input), body sensors (accelerometers, IMUs, gyroscopes, from other devices on the vehicle), safety system status (ABS braking engaged, ESP status, torque vectoring, airbag deployment, etc.)], and then react based on this data. Reacting may mean, for example, changing the force, position, velocity, or power consumption of the actuator in response to the data.

For example, the active safety suspension may interface with GPS on board the vehicle. In one embodiment, the vehicle contains (either locally or via a network connection) a map correlating GPS location with road conditions. In this embodiment, the active suspension may react in an anticipatory fashion to adjust the suspension in response to the location. For example, if the location of a speed bump is known, either through externally furnished data or data collected by the vehicle, the actuators can start to lift or off-load the wheels immediately before impact. Similarly, topographical features, such as hills, can be better recognized and the system can respond accordingly. Since civilian GPS is limited in its resolution and accuracy, GPS data can be combined with other vehicle sensors, such as, for example, an IMU (or accelerometers) using a filter such as a Kalman Filter, in order to provide a more accurate position estimate.

In another example, the active suspension may not only receive data from other sensors, but may also command and/or request data from other vehicle subsystems. In a self-driving vehicle, the suspension may sense or anticipate rough terrain, and send a command to the self-driving control system to deviate to another road or direction of travel.

In another embodiment, the vehicle may automatically generate and store the map described above by sensing road conditions using sensors associated with the active suspension and other vehicle devices.

In some embodiments, the ride dynamics may be improved by integrating an active suspension with other sensors and systems on the vehicle, and utilizing predictive and/or reactive sensor data from a number of sources (including redundant sources, which may be combined and used to provide greater accuracy to the overall system). In addition, the active suspension may send commands to other systems, such as safety systems, in order to improve their performance. Several data networks exist to communicate this data between subsystems, such as, for example, CAN (controller area network) and FlexRay.

Figure 10:
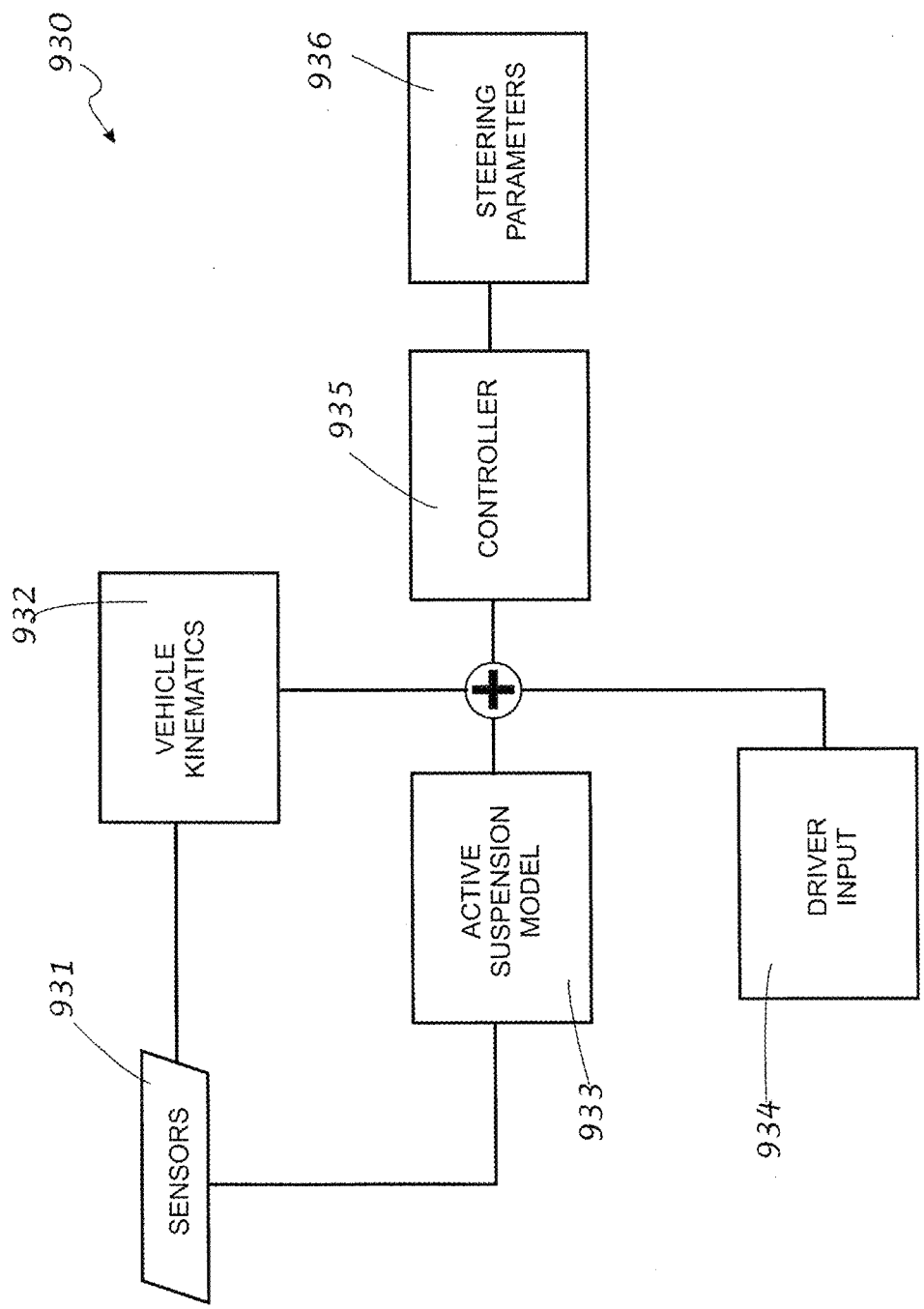
FIG. 10 illustrates a vehicle system that combines active suspension system control and EPS and/or active steering system.

FIG. 10 illustrates an embodiment where the operation of a vehicle system 930 includes an EPS and/or active steering and an active suspension system. During operation, the system receives input from sensors 931, such as for example, vehicle yaw and/or yaw rate, vehicle velocity, vehicle acceleration, vehicle lateral acceleration, steering wheel position, steering wheel torque, wheel position, wheel angular velocity, and wheel acceleration, and suspension spring compression.

Based on sensor input the vehicle kinematics model 932 computes the vehicle posture. Based on sensor input, the active suspension model 933 determines the orientation of the wheels with respect to the vehicle and the road. Based on this information, and driver input 934, the controller 935 determines the proper steering parameters 936, such as for example, torque to be applied by the EPS to achieve the desired steering perception, such as for example, stiffness, return to center torque and road feel, regardless of the vehicle body orientation relative the road, vehicle speed or acceleration. This control may be affected by 1) the vehicle kinematics model using current information from one or more sensors, and/or 2) the state of the active suspension system.

Figure 11:
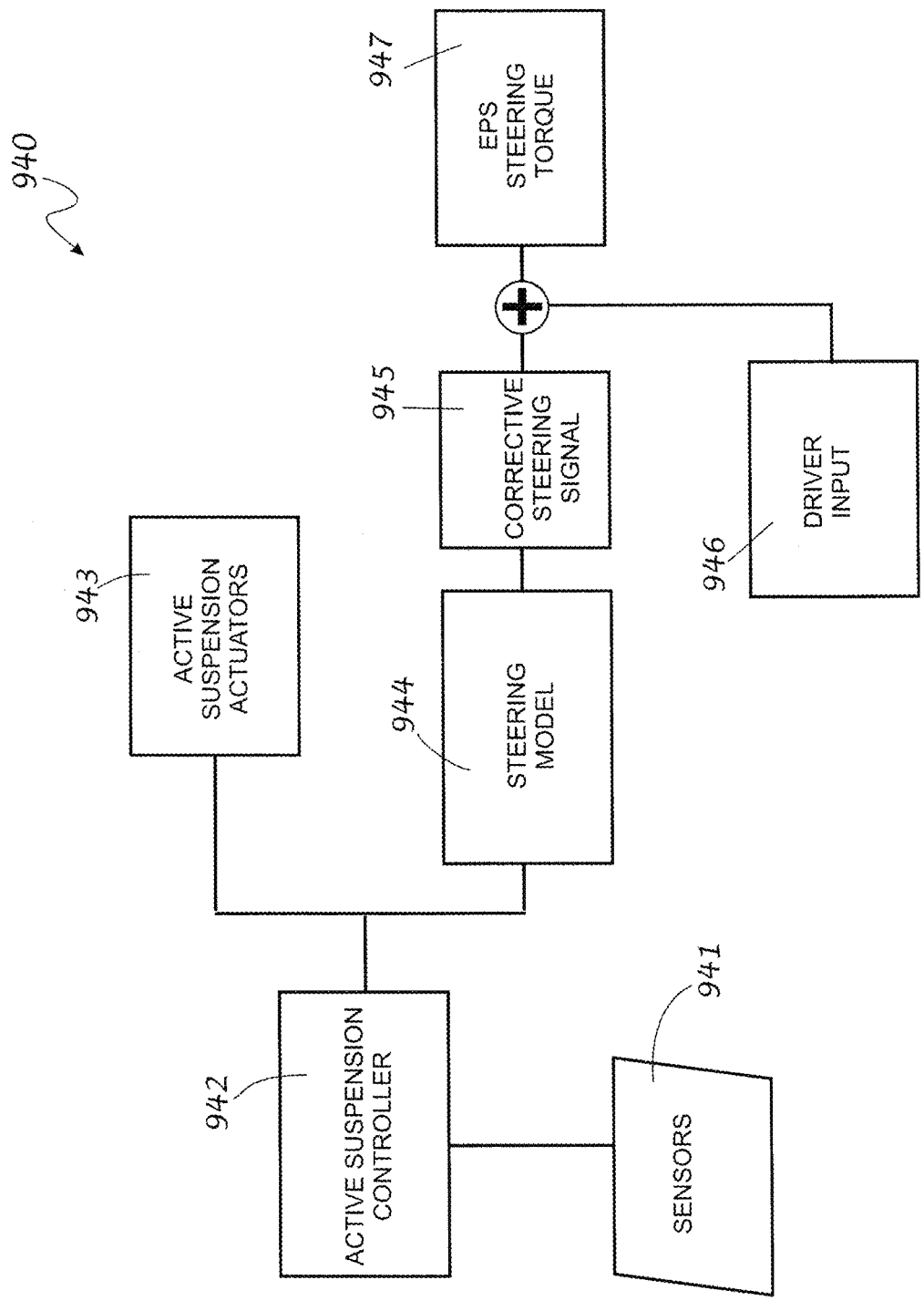
FIG. 11 illustrates a vehicle system that combines active suspension system control and EPS and/or active steering system with look forward predictive capacity.

FIG. 11 illustrates an embodiment where the operation of a vehicle system 940 includes an EPS and/or active steering and an active suspension system. Sensors 941 provide input to an active suspension system controller 942. The controller 942 commands the active suspension actuators 23 while substantially simultaneously providing information to a steering model 944 which computes the proper posture to be taken by the EPS and/or the active steering system in anticipation to the changes that will be instituted in the suspension system. Corrective steering signals 945 in conjunction with driver steering input 946 determine, for example, an EPS steering torque 947 to be applied after a certain interval when the suspension system changes will be in effect.

The time interval between when the sensor input is received and the suspension actuators 943 respond may be short, for example a few milliseconds. Based on sensor input, the time period may be substantially longer. The suspension controller may be able to predict what suspension or steering posture may be necessary based on various vehicle and road parameters. For example, an optical system may detect an obstruction, such as a tree branch at a certain distance from the vehicle that will be struck by the wheels given the vehicles trajectory and speed. By predicting certain suspension system posture that will be necessary when the branch is hit, the controller can prepare the suspension and steering systems so they can anticipate the collision rather than react after the branch is hit. U.S. Pat. Nos. 8,839,920 and 8,841,786 which detail the construction, operation and use of rapid response active suspension system actuators are incorporated herein by reference in their entirety.

Figure 12A:
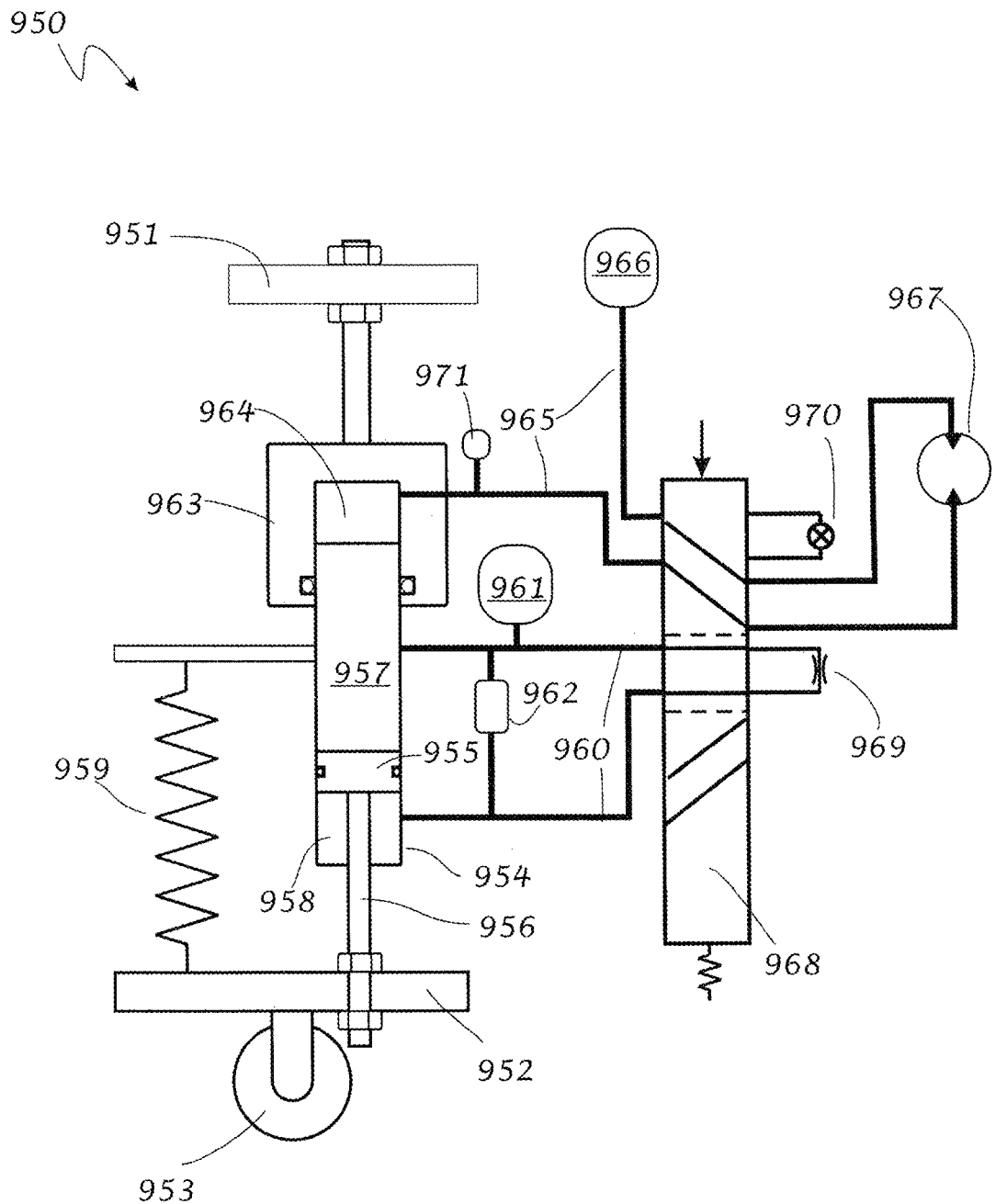
FIG. 12A illustrates a schematic of an embodiment of an aspect of an active suspension system including a primary active suspension actuator and a secondary height adjustment actuator.

FIG. 12A depicts an embodiment of an aspect of an active suspension system 950 with top mount 951 attached to the vehicle body and unsprung mass element 952 attached to vehicle wheel 953. Primary damper 954 includes a piston 955, piston shaft 956, fluid filled compression volume 957, and fluid filled extension volume 958. Piston shaft 956 and one end of suspension spring 959 are attached to element 952, while the second end of suspension spring 959 is constrained to move with the housing of damper 954. The primary hydraulic circuit 960 fluidly connects the compression volume 957 to fluid reservoir 961 although, alternatively or additionally, a reservoir may be connected to the extension volume 958 by means of the hydraulic circuit. In some embodiments, these reservoirs are at least partially filled with, for example, air or other compressible medium. Bypass control system 962 may be used to allow direct flow between compression volume 957 and extension volume 958 under certain conditions, such as for example, excessive flow rates emanating from compression or expansion volumes or excessive pressure build-up in either chamber.

Secondary actuator 963 is interposed between top mount 951 and the housing of the primary damper 954. In the embodiment shown in FIG. 12A, the housing acts as a piston and is slideably received in secondary chamber 964. The secondary hydraulic circuit 965 fluidly connects secondary chamber 964 to fluid reservoir 966 and hydraulic motor/pump 967 when hydraulic valve 968 is in a first position, shown in FIG. 12A. When the valve is in this first position, the primary circuit may be fluidly connected to a fixed or variable resistance 969. When the hydraulic valve 968 is in a second position, the hydraulic motor/pump is fluidly connected to the primary circuit 960 and the secondary circuit 965 is connect to valve 970.

When hydraulic valve 968 is in the first position, as shown in FIG. 12A, the hydraulic motor/pump 967 may be used to raise or lower the vehicle by pumping fluid between chamber 964 and reservoir 966. In some embodiments, the reservoir 966 may be biased to a pressure that will support the portion of vehicle weight applied at top mount 951 without the intervention of the motor/pump. The motor/pump may then be used to supply the incremental power to raise or lower the vehicle at the desired rate. While the valve 968 is in the first position, the first actuator may be used as a passive or semi-active damper by configuring valve 969 a constant or variable restriction respectively.

When hydraulic valve 968 is in the second position (not shown in FIG. 12A), the hydraulic motor/pump is fluidly connected to the primary circuit 960 wherein the motion of the piston 955 is actively controlled by the motor/pump 967. When valve 968 is in this second position, the fluid in chamber 964 is trapped in place by valve 970 and not allowed to flow out. Alternatively valve 970 may be a controlled valve that may, for example, allow fluid to be forced out of the chamber by the weight of the vehicle if the bias pressure of reservoir 966 is set at a lower value.

A reservoir 971 may be fluidly connected to the secondary circuit to damp out small road induced disturbances. In some embodiments, the reservoir 971 is at least partially filled with compressible medium, such as for example a gas or other compressible material. A spring loaded piston may also be used. A flow restriction may be interposed between the reservoir 971 and the secondary circuit so that the reservoir 971 acts as a damper at a desired frequency to, for example, improve wheel control, but not too large to hinder the ability of the active suspension to control the vehicle body.

Hydraulic valve 968 is shown as a single valve but the same function may be accomplished by, for example, a combination of active and/or multiple hydraulic valves and/or powered or passive valves.

Figure 12B:
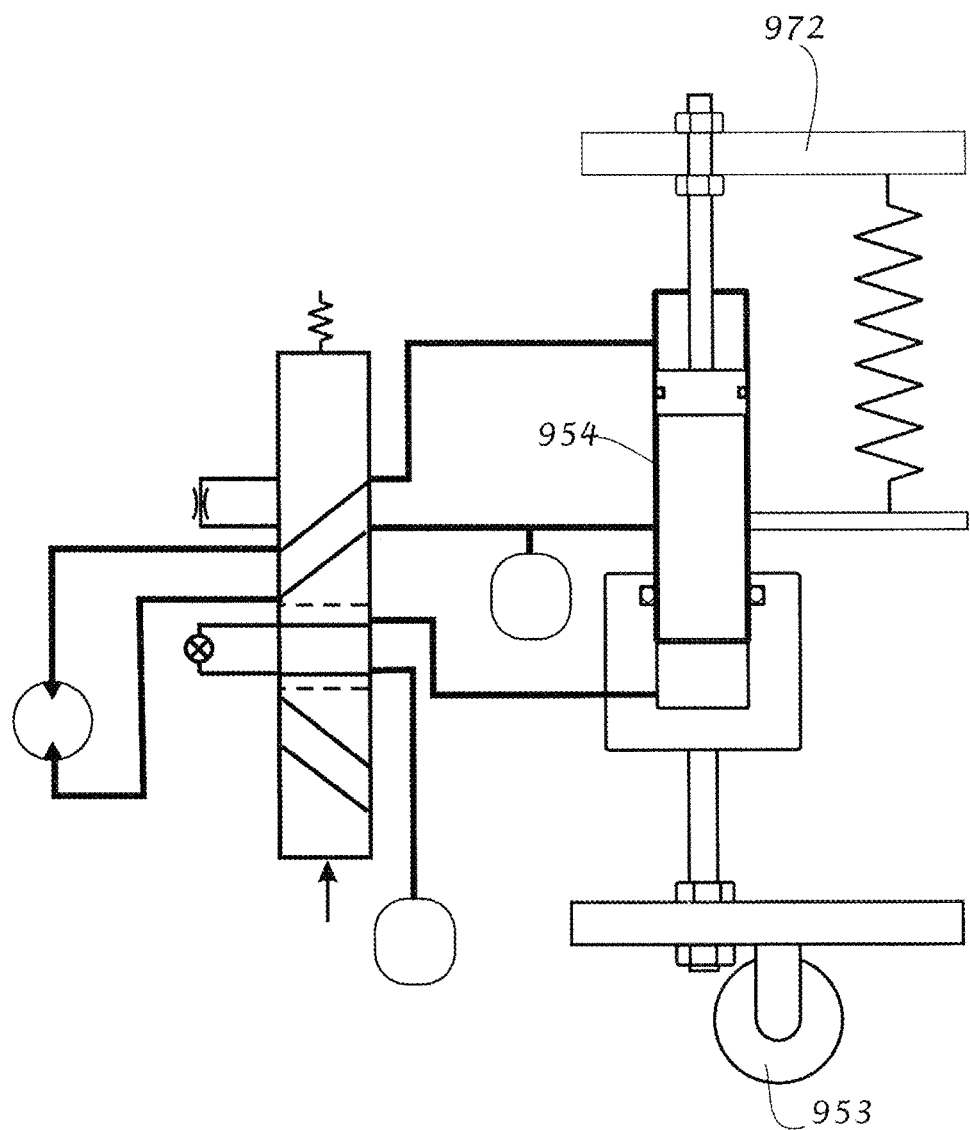
FIG. 12B illustrates an alternative embodiment of the system in FIG. 12A.

FIG. 12B illustrates an embodiment of an aspect wherein the orientation of damper 954 has been inverted relative to the wheel 953 and top mount 972.

Figure 13:
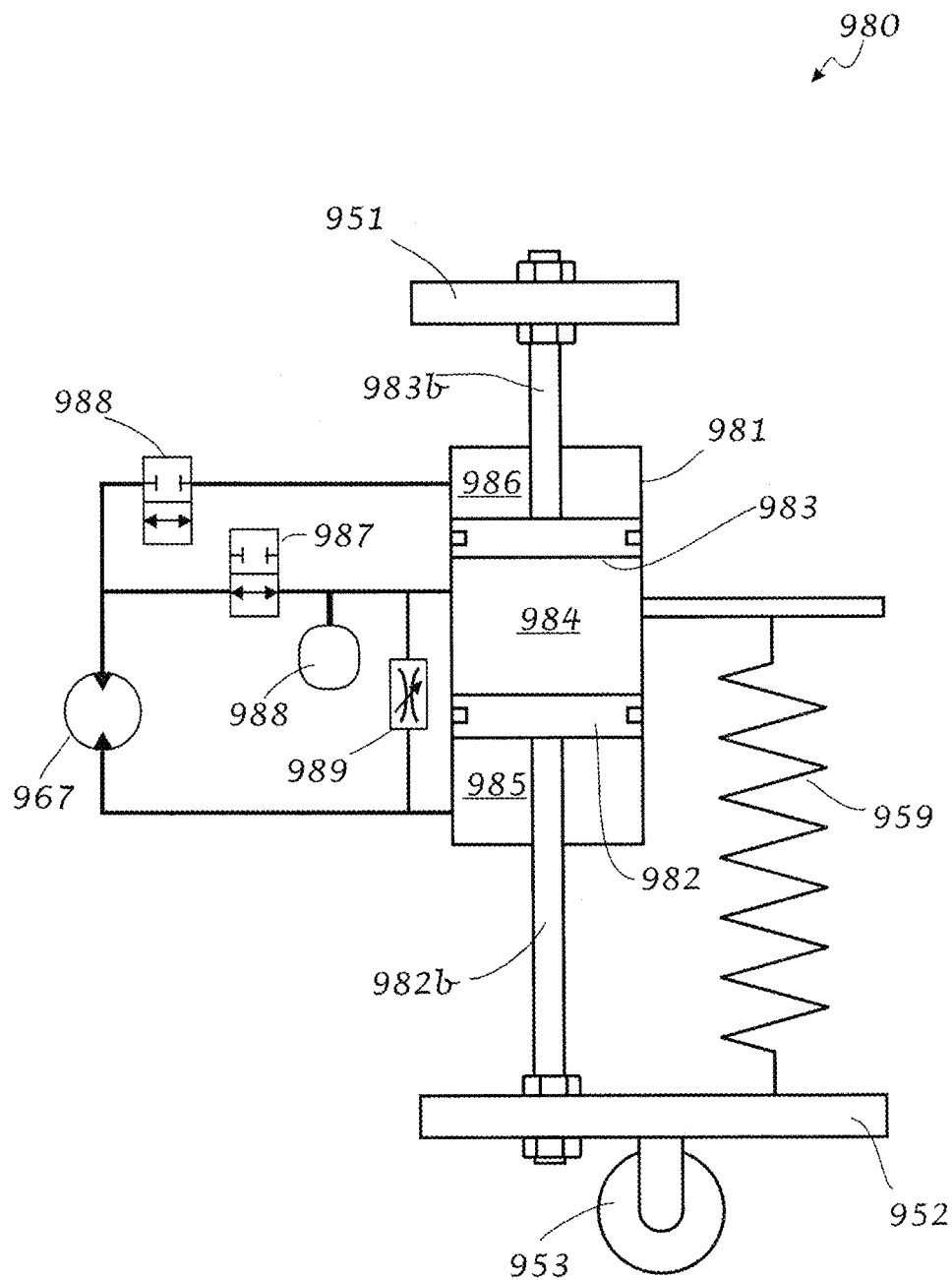
FIG. 13 illustrates a schematic of another embodiment of an aspect of an active suspension system including a primary active suspension actuator and a secondary height adjustment actuator.

FIG. 13 depicts an embodiment of an aspect of an active suspension system 980 with top mount 951 attached to the vehicle body and unsprung mass element 952 attached to vehicle wheel 953. Damper housing 981 includes a primary suspension piston 982 with primary piston shaft 982b attached to element 952, and a secondary height adjustment piston with secondary piston shaft 983b attached to top mount 951. Housing 981 also includes fluid filled compression volume 984, extension volume 985 and height adjustment volume 986. Suspension spring 959 is interposed between housing 981 and element 952.

Hydraulic motor/pump 967, primary circuit valve 987 and secondary circuit valve 988 are configured and constructed to regulate transfer and distribution fluid among volumes 984, 985 and 986 and control the position of pistons 982 and 983 relative to housing 981, as well as the net force exerted on them by the fluid. With valves 987 and 988 positioned as shown in FIG. 13, the position of piston 985 acts as a part of the active suspension system to control the position of wheel 953 with respect to top mount 951. Piston 983 remains locked in place relative to housing 981 while reservoir 988 accommodates the difference in the volume displaced by the motion of piston 982 in the compression volume and extension volume because of the volume occupied by shaft 982b in the extension volume. Variable restriction device 989, which may be actively or passively controlled, may be used to bypass motor/pump 967 when fluid flow being exchanged between the compression and extension volumes under certain circumstances.

In addition to the above, if primary circuit valve 987 and secondary circuit valve 988 are placed in their alternate positions, the vehicle ride height may be controlled by using the motor/pump to increase ride height by transferring fluid into volume 986 or to lower ride height by transferring fluid out of volume 986. While valve 987 is in the closed position, fluid exchange between volumes 984 and 985 may flow through and be controlled by valve 989.

Figure 14:
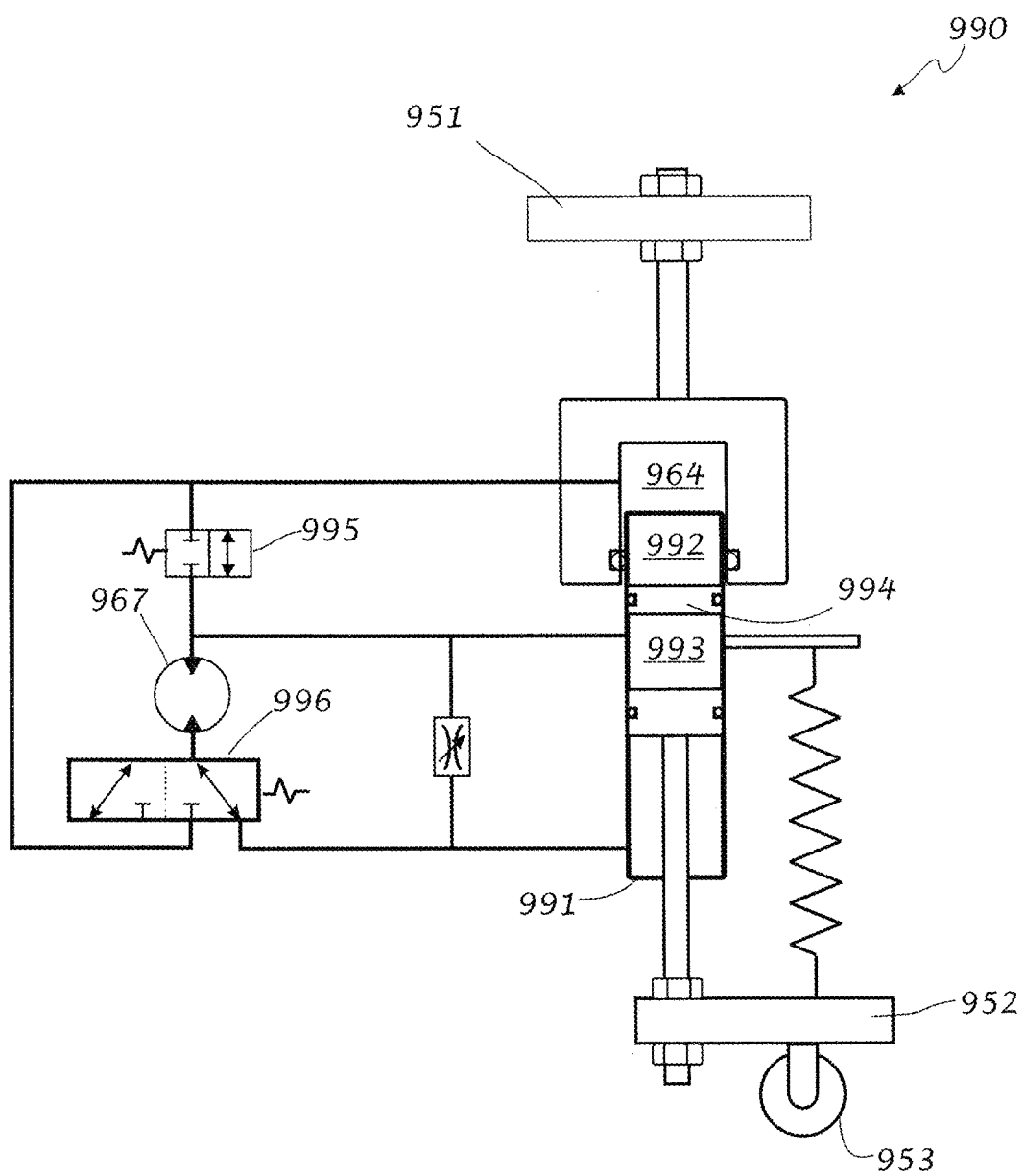
FIG. 14 illustrates a schematic of a further embodiment of an aspect of an active suspension system including a primary active suspension actuator and a secondary height adjustment actuator.

FIG. 14 depicts a further embodiment of an aspect of an active suspension system 990 with top mount 951 attached to the vehicle body and unsprung mass element 952 attached to vehicle wheel 953. In this embodiment the reservoir (shown as element 961 in FIG. 12A) is incorporated in housing 991 as reservoir volume 992 and separated from compression volume 993 by floating piston 994. When the hydraulic valves 995 and 996 are in their normal positions (as shown in FIG. 14), the damper 991 operates as a active suspension damper and the fluid in volume 964 is trapped. When valve 995 is shifted to its alternate position, fluid from volume 964 flows into compression volume 993, as long as the pressure in the accumulator/reservoir 992 is lower than the pressure in volume 964, and the ride height is reduced. By moving valve 996 to its alternate position and leaving valve 995 in its normal position, the pump can be used to move fluid from the compression volume 993 to volume 964, in order to raise the vehicle. If necessary, motor/pump 967 can also be used to pump fluid from volume 964 to the compression volume 993 if an adverse pressure differential needs to be overcome. In situations where the motor/pump 967 is used to pump fluid into or out of volume 964, valve 995 would be placed in its normal position and valve 996 would be maintained in its alternate position.

Figure 15:
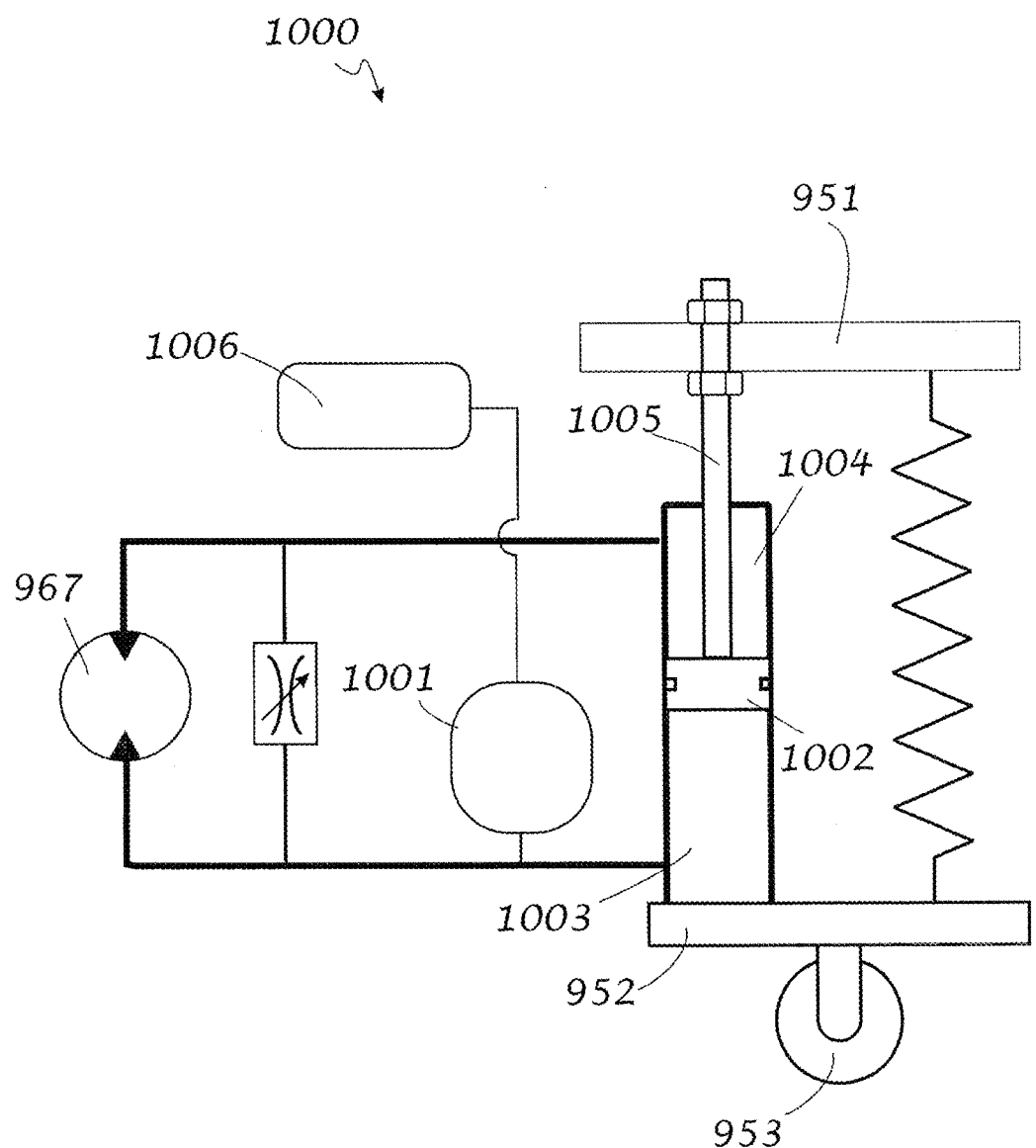
FIG. 15 illustrates a schematic of a yet further embodiment of an aspect of an active suspension system where vehicle ride height is adjusted by varying average system operating pressure.

FIG. 15 depicts a further embodiment of an aspect of an active suspension system 1000, with top mount 951 attached to the vehicle body and unsprung mass element 952 attached to vehicle wheel 953. Reservoir 1001 is configured and constructed to accommodate the difference in the volume displaced by the motion of piston 1002 in the compression volume 1003 and extension volume 1004 because of the volume occupied by shaft 1005 in the extension volume. The vehicle ride height may be adjusted by increasing or reducing the average operating pressure of the reservoir. For example, if the pressure in the reservoir is increased the average pressure on both faces of the piston will increase.

However, the force acting on the piston face opposite the side where the shaft is attached will be increased by a greater amount than the face where the piston shaft is attached. The net differential force on the piston, when the pressure on both sides of the piston is the same, is equal to:

Net Force on Piston=System Operating Pressure× Shaft Cross-sectional Area

Therefore, by changing average system operating pressure, the ride height of the vehicle can be adjusted. The system pressure may be adjusted by using an auxiliary pump 1006. Alternatively or additionally, the operating pressure may be adjusted by using hydraulic motor/pump 967 to add fluid from an external storage device (not shown) to the hydraulic circuit or to remove fluid from the hydraulic circuit to the external storage device. While embodiments for controlling ride height have been disclosed with reference to active suspension systems the concepts may also be applied to semi-active and passive suspension systems.

Additionally, while EPS is used as an example in the description of several embodiments above, any other controllable (such as electronically controllable) steering system may be used. Additionally, for drive-by-wire systems, either both or only one of the steering actuator (that turns the vehicle wheels) and the steering wheel actuator (that provides feedback for the driver via the steering wheel) may be commanded by the system.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of using an active suspension system to mitigate vehicle rollover possibility while travelling along a road that includes a roll-over trip, the method comprising:
   determining if a vehicle is skidding in a direction that has a component that is perpendicular to a longitudinal axis of the vehicle;
   locating a roll-over trip situated in the direction of the skid;
   predicting a time when a vehicle wheel will reach the roll-over trip; and
   using the active suspension system to at least begin a maneuver to mitigate vehicle rollover possibility.

2. The method of claim 1, further comprising predicting a roll-over direction, wherein the maneuver includes inducing angular velocity in a body of the vehicle about the longitudinal axis that is in a direction opposed to roll-over direction before a wheel of the vehicle impacts the roll-over trip.

3. The method of claim 1, further comprising using the active suspension system to reduce a wheel force applied by a wheel of the vehicle on a surface of the road.

4. The method of claim 1, wherein at least one side-view camera is used in locating the roll-over trip.

5. The method of claim 1, further comprising using a range finder to estimate a time when a wheel of the vehicle is projected to strike the roll-over trip.

6. The method of claim 5, wherein the range finder is selected from a group consisting of an acoustic range finder and a laser range finder.

* * * * *